United States Patent
Rathinasamy et al.

(10) Patent No.: US 11,598,926 B2
(45) Date of Patent: Mar. 7, 2023

(54) CABLE CONNECTOR RELEASE SYSTEM

(71) Applicant: Dell Products L.P., Round Rock, TX (US)

(72) Inventors: Shree Rathinasamy, Round Rock, TX (US); Victor Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 17/167,191

(22) Filed: Feb. 4, 2021

(65) Prior Publication Data

US 2022/0244470 A1    Aug. 4, 2022

(51) Int. Cl.
*G02B 6/38* (2006.01)
*G02B 6/42* (2006.01)

(52) U.S. Cl.
CPC ......... *G02B 6/3898* (2013.01); *G02B 6/4246* (2013.01); *G02B 6/4292* (2013.01)

(58) Field of Classification Search
CPC .. G02B 6/3825; G02B 6/3897; G02B 6/3898; G02B 6/4292
See application file for complete search history.

(56) References Cited

U.S. PATENT DOCUMENTS

2022/0075126 A1*   3/2022   Chang .................. G02B 6/3825

OTHER PUBLICATIONS

"Do You Know about Push-Pull Tab Fiber Patch Cables?," Cables-Solutions.com http://www.cables-solutions.com/do-you-know-about-push-pull-tab-patch-cables.html.

* cited by examiner

*Primary Examiner* — Michael P Mooney
(74) *Attorney, Agent, or Firm* — Joseph Mencher

(57) ABSTRACT

A cable release system includes a handle. An elongated base extends from the handle and includes a length that allows the handle to be held adjacent a cable connector distal end of a cable connector that is connected to a computing device while the elongated base extends adjacent the cable connector and an elongated base distal end of the elongated base is located adjacent a securing latch on the cable connector. An actuating member is located on the elongated base distal end of the elongated base and is configured to actuate the securing latch on the cable connector when the elongated base distal end of the elongated base is located adjacent the securing latch on the cable connector.

20 Claims, 28 Drawing Sheets

CABLE CONNECTOR RELEASE SYSTEM

BACKGROUND

The present disclosure relates generally to information handling systems, and more particularly to releasing cable connectors from information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices (e.g., switch devices), storage systems, and/or other computing devices known in the art, are often coupled together by cables such as fiber optic cables, Direct Attach Copper (DAC) cables, and/or other cables known in the art. For example, some conventional fiberfiber optic cables include a pair of fiberfiber optic connectors that are each configured to engage respective transceiver connectors on a transceiver device (e.g., a 10/25 GbE transceiver device) that is connected to the computing device, and a respective securing latch may be provided adjacent each fiberfiber optic connector and may be configured to engage the transceiver device to secure the fiberfiber optic connectors to the transceiver connectors. Furthermore, many fiberfiber optic cables include a "pull-tab" release mechanism that is coupled to each of the securing latches and that includes an actuator that extends away from the fiber optic connectors, and when the fiber optic connectors are engaged with the transceiver connectors with the securing latches engaged with the transceiver device to secure the fiber optic connectors to the transceiver connectors, the actuator on the "pull-tab" release mechanism may be pulled to disengage the securing latches from the transceiver device in order to allow the fiber optic connectors to be disengaged from the transceiver connectors so that the fiber optic cable may be disconnected from the computing device. As will be appreciated by one of skill in the art in possession of the present disclosure, such "pull-tab" release mechanisms are particular beneficial when fiber optic cables/connectors are densely populated on the computing device such access to the securing latches on any particular cable fiber optic cable is inhibited by other fiber optic cables/connectors. However, the use of such "pull-tab" release mechanisms on conventional fiber optic cables can raise some issues.

For example, fiber optic cables that are used in computing devices provided as testing equipment in data centers, vendor test laboratories, and/or other locations, may be frequently handled and require frequent connection/disconnection from the transceiver devices discussed above, which can result is the actuator on the "pull-tab" release mechanism breaking off of the "pull-tab" release mechanism, particularly when such actuators are provided using very thin plastic materials (e.g., to reduce costs and allow the tab to be positioned between densely populated fiber optic cables/connectors that would otherwise present difficulties with regard to accessing the securing latches as discussed above). This can result in the need to disconnect fiber optic cables with broken "pull-tab" release mechanism actuators from corresponding transceiver devices, which may require an amount of force that can cause damage to the cable, the transceiver device, the transceiver connector, and/or other components, and results in support calls, system down time, and/or other costs. As such, fiber optic cables with broken "pull-tab" release mechanism actuators are often discarded, increasing cabling costs as well.

Accordingly, it would be desirable to provide a cable release system that addresses the issues discussed above.

SUMMARY

According to one embodiment, an Information Handling System (IHS) includes a processing system; a system connector that is coupled to the processing system; a cable connector that is connected to the system connector and that includes a securing latch that engages the system connector to secure the cable connector to the system connector; and a cable release system that includes: a handle; an elongated base that extends from the handle and that includes a length that is configured to allow the handle to be held adjacent a cable connector distal end of the cable connector while the elongated base extends adjacent the cable connector and an elongated base distal end of the elongated base is located adjacent the securing latch; and an actuating member that is located on the elongated base distal end of the elongated base and that is configured to actuate the securing latch when the elongated base distal end of the elongated base is located adjacent the securing latch on the cable connector.

BRIEF DESCRIPTION OF THE DRAWINGS

FIGS. 7A, 7B, and 7C being utilized with the cable connector systems and computing system of FIG. 9 during the method of FIG. 8.

FIGS. 7A, 7B, and 7C being utilized with the cable connector systems and computing system of FIG. 9 during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
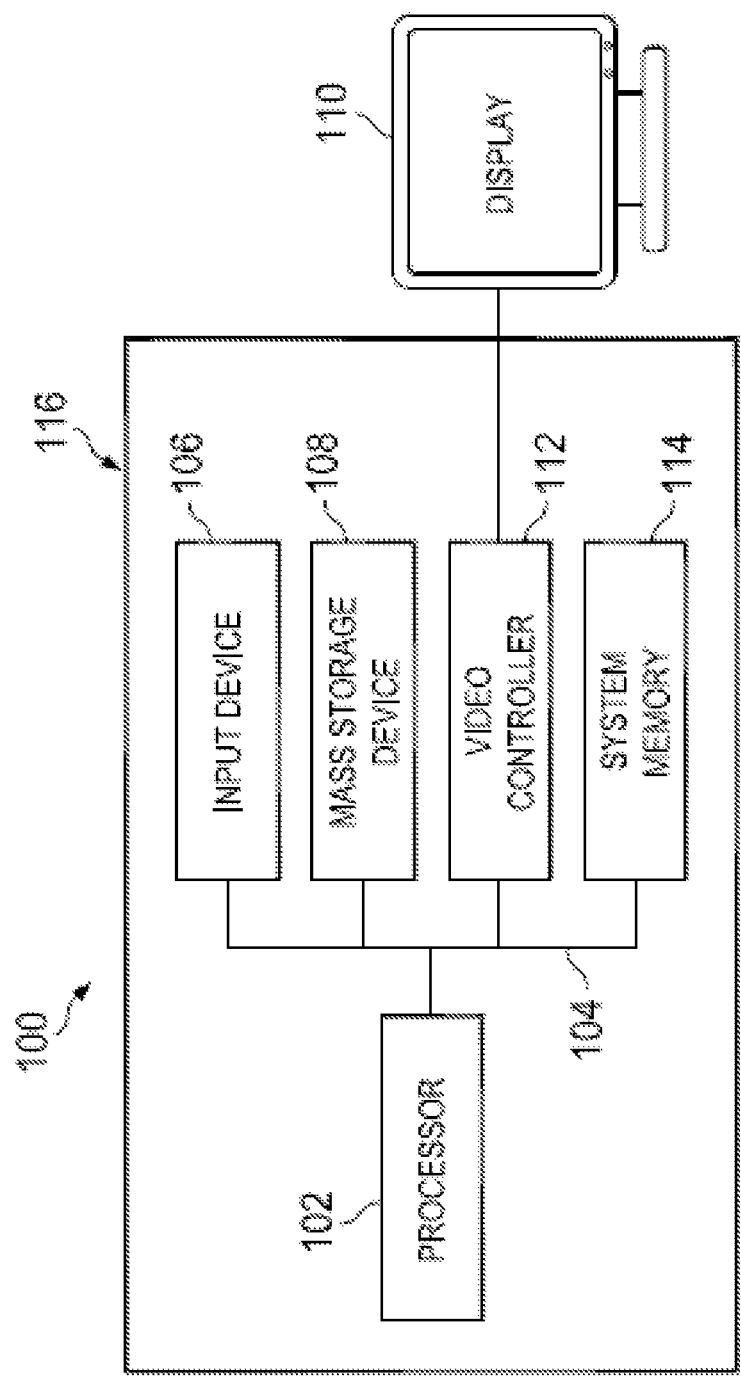
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
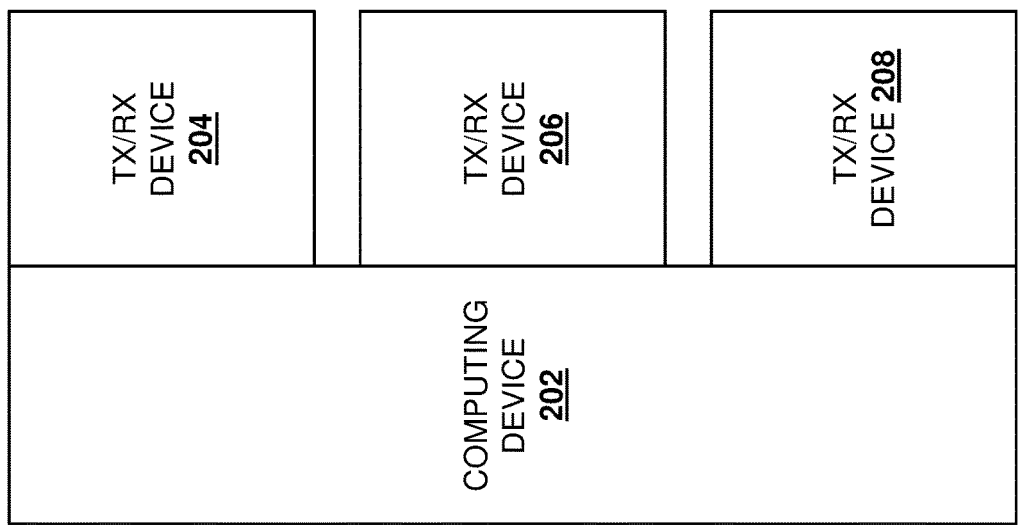
FIG. 2 is a schematic view illustrating an embodiment of a computing system that may be used with the cable release system of the present disclosure.

Referring now to FIG. 2, an embodiment of a computing system 200 is illustrated. In the illustrated embodiment, the computing system 200 includes a computing device 202. In an embodiment, the computing device 202 may be provided by the IHS 100 discussed above with reference to FIG. 1, and/or may include some or all of the components of the IHS 100, and in specific examples may be provided by a server device, a networking device (e.g., a switch device), or a storage system. However, while illustrated and discussed as being provided by particular computing devices, one of skill in the art in possession of the present disclosure will recognize that the computing device provided in the computing system 200 may include any devices that may be configured to couple to cables as discussed below. In the illustrated embodiment, a plurality of transceiver (TX/RX) devices 204, 206, and up to 208 are connected to the computing device 202, and one of skill in the art in possession of the present disclosure will appreciate how the computing device 202 may include connectors or other coupling elements that allow the transceiver devices 204-208 to be connected to and secured with the computing device 202. In a specific example, the transceiver devices 204-208 may be provided by 10/25 Gbe transceiver devices that are configured to couple to fiber optic cables as discussed below, but one of skill in the art in possession of the present disclosure will recognize that transceiver devices or other cable connection features may be provided with the computing device 202 in order to allow the computing device to coupe to other cables (e.g., Direct Attach Copper (DAC) cables) while remaining within the scope of the present disclosure as well. However, while a specific computing system 200 has been illustrated and described, one of skill in the art in possession of the present disclosure will recognize that the computing system of the present disclosure may include a variety of components and component configurations while remaining within the scope of the present disclosure as well.

Figure 3:
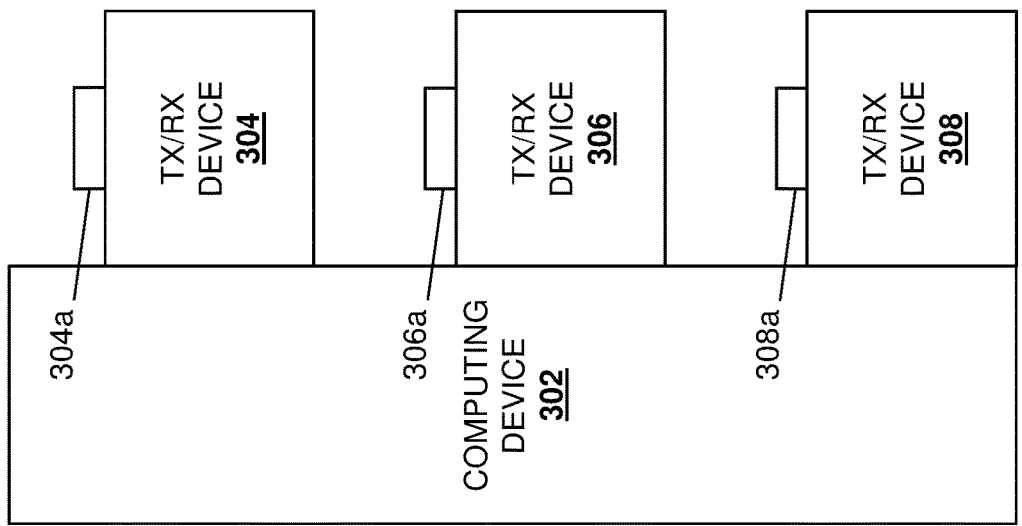
FIG. 3 is a schematic view illustrating an embodiment of a computing system that may be used with the cable release system of the present disclosure.

Referring now to FIG. 3, an embodiment of a computing system 300 is illustrated. In the illustrated embodiment, the computing system 300 includes a computing device 302. In an embodiment, the computing device 302 may be provided by the IHS 100 discussed above with reference to FIG. 1, and/or may include some or all of the components of the IHS 100, and in specific examples may be provided by a server device, a networking device (e.g., a switch device), or a storage system. However, while illustrated and discussed as being provided by particular computing devices, one of skill in the art in possession of the present disclosure will recognize that the computing device provided in the computing system 300 may include any devices that may be configured to couple to cables as discussed below. In the illustrated embodiment, a plurality of transceiver (TX/RX) devices 304, 306, and up to 308 are connected to the computing device 302, and one of skill in the art in possession of the present disclosure will appreciate how the computing device 302 may include connectors or other coupling elements that allow the transceiver devices 304-308 to be connected to and secured with the computing device 302. In a specific example, the transceiver devices 304-308 each include respective cable connector securing subsystems that include the release buttons 304a, 306a, and 308a, respectively, illustrated in FIG. 3, and may be provided as described by the inventors of the present disclosure in U.S. patent application Ser. No. 16/902,199, filed on Jun. 15, 2020, the disclosure of which is incorporated herein by reference in its entirety. As such, and as described in that patent application, the release buttons 304a, 306a, and 308a may be actuated to release cable connectors that are connected to the transceiver devices 304, 306, and 308, respectively, and secured to those transceiver devices via their cable connector securing subsystems as discussed in further detail below. However, while a specific computing system 300 has been illustrated and described, one of skill in the art in possession of the present disclosure will recognize that the computing system of the present disclosure may include a variety of components and component configurations while remaining within the scope of the present disclosure as well.

Figure 4A:
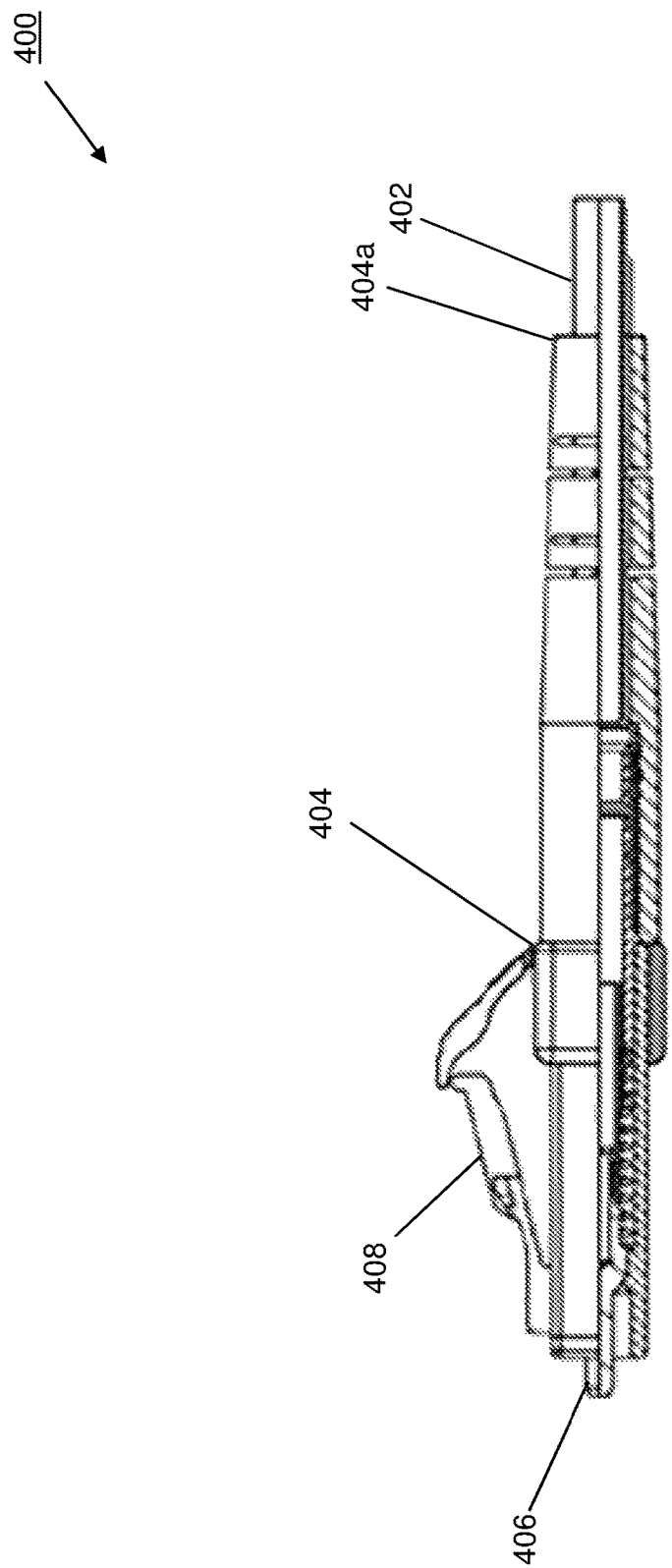
FIG. 4A is a side view illustrating an embodiment of a cable connector system that may be used with the computing system of FIG. 2 and the cable release system of the present disclosure.
Figure 4B:
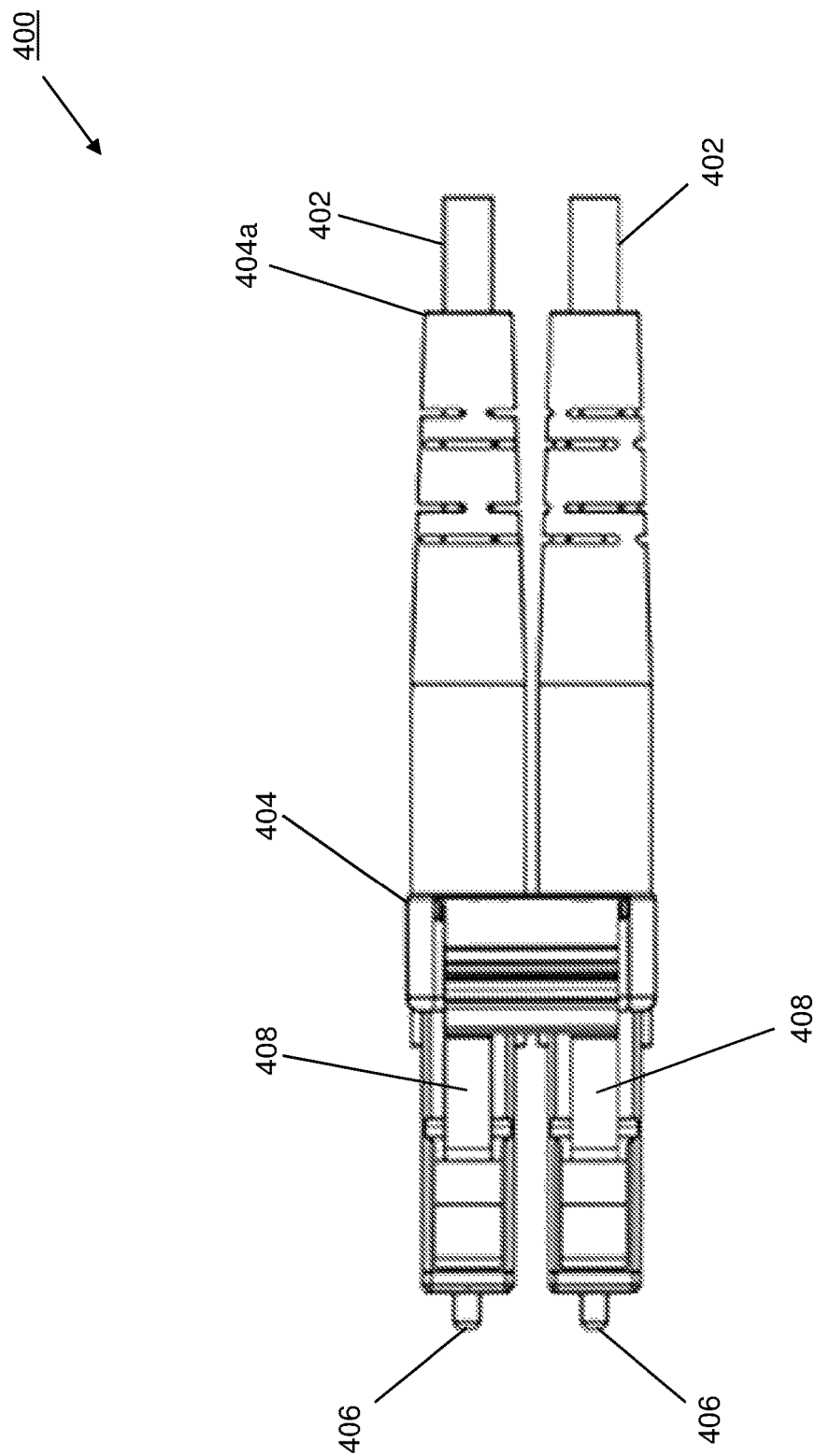
FIG. 4B is a top view illustrating an embodiment of the cable connector system of FIG. 4A.

Referring now to FIGS. 4A and 4B, an embodiment of a cable connector system 400 is illustrated that may be utilized with the computing system 200 discussed above with reference to FIG. 2 and the cable connector release system of the present disclosure. In the illustrated embodiment, the cable connector system 400 includes cabling 402 that extends from a cable connector base 404, and one of skill in the art in possession of the present disclosure will appreciate that the cabling 402 may extend for any of a variety of lengths known in the art. The cable connector base 404 includes a cable connector base distal end 404a, with cable connectors 406 extending from the cable connector base 404 opposite the cable connector base distal end 404a, and respective securing latches 408 located on the cable connector base 404 adjacent each of the cable connectors 406. In the embodiments discussed below, the cable connector base distal end 404a is defined as a location on the cable connector system 400 between the cable connectors 406 and the cabling 402 that, when the cable connector system 400 is provided in a densely populated configuration with other cable connector systems, allows a user to utilize the cable connector release system of the present disclosure to perform the functionality discussed below. As such, the cable connector base distal end 404a may be provided different distances from the cable connectors 406 while remaining within the scope of the present disclosure. One of skill in the art in possession of the present disclosure will recognize that the cable connector system 400 is illustrated in FIGS. 4A and 4B as being provided on a fiber optic cable and including a pair of fiber optic cable connectors each having a respective securing latch. However, other data transmission technologies (e.g., copper wiring, etc.) using other cable connector technologies (e.g., DAC cable connectors) may benefit from the teachings of the present disclosure and thus are envisioned as falling within its scope as well.

Figure 5:
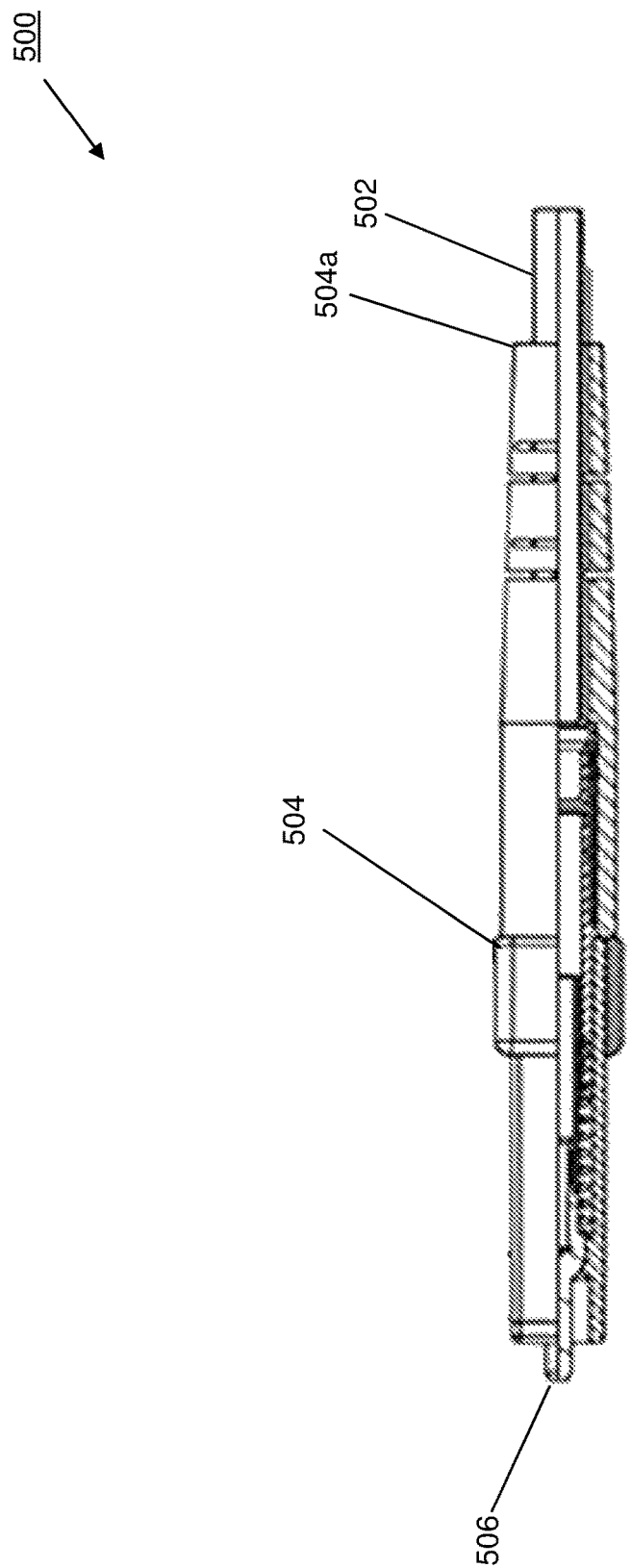
FIG. 5 is a side view illustrating an embodiment of a cable connector system that may be used with the computing system of FIG. 3 and the cable release system of the present disclosure.

Referring now to FIG. 5, an embodiment of a cable connector system 500 is illustrated that may be utilized with the computing system 300 discussed above with reference to FIG. 3 and the cable connector release system of the present disclosure. In the illustrated embodiment, the cable connector system 500 includes cabling 502 that extends from a cable connector base 504, and one of skill in the art in possession of the present disclosure will appreciate that the cabling 502 may extend for any of a variety of lengths known in the art. The cable connector base 504 includes a cable connector base distal end 504a, with cable connectors 506 extending from the cable connector base 504 opposite the cable connector base distal end 504a. In the embodiments discussed below, the cable connector base distal end 504a is defined as a location on the cable connector system 500 between the cable connectors 06 and the cabling 4502 that, when the cable connector system 500 is provided in a densely populated configuration with other cable connector systems, allows a user to utilize the cable connector release system of the present disclosure to perform the functionality discussed below. As such, the cable connector base distal end 04a may be provided different distances from the cable connectors 4506 while remaining within the scope of the present disclosure.

One of skill in the art in possession of the present disclosure will appreciate that the cable connector system 500 differs from the cable connector system 400 discussed above with reference to FIGS. 4A and 4B due to its lack of securing latches (e.g., the securing latches 408 discussed above), and that the cable connector system 500 may utilize the cable connector securing subsystems on the transceiver devices 304-308 in the computing system 300 in place of such securing latches in order to be secured to the transceiver devices 304-308. One of skill in the art in possession of the present disclosure will recognize that the cable connector system 500 is illustrated in FIG. 5 may be otherwise similar to the cable connector system 400 discussed above with reference to FIGS. 4A and 4B, and thus may be provided by a fiber optic cable and include a pair of fiber optic cable connectors. However, other data transmission technologies (e.g., copper wiring, etc.) using other cable connector technologies (e.g., DAC cable connectors) may benefit from the teachings of the present disclosure and thus are envisioned as falling within its scope as well.

Figure 6A:
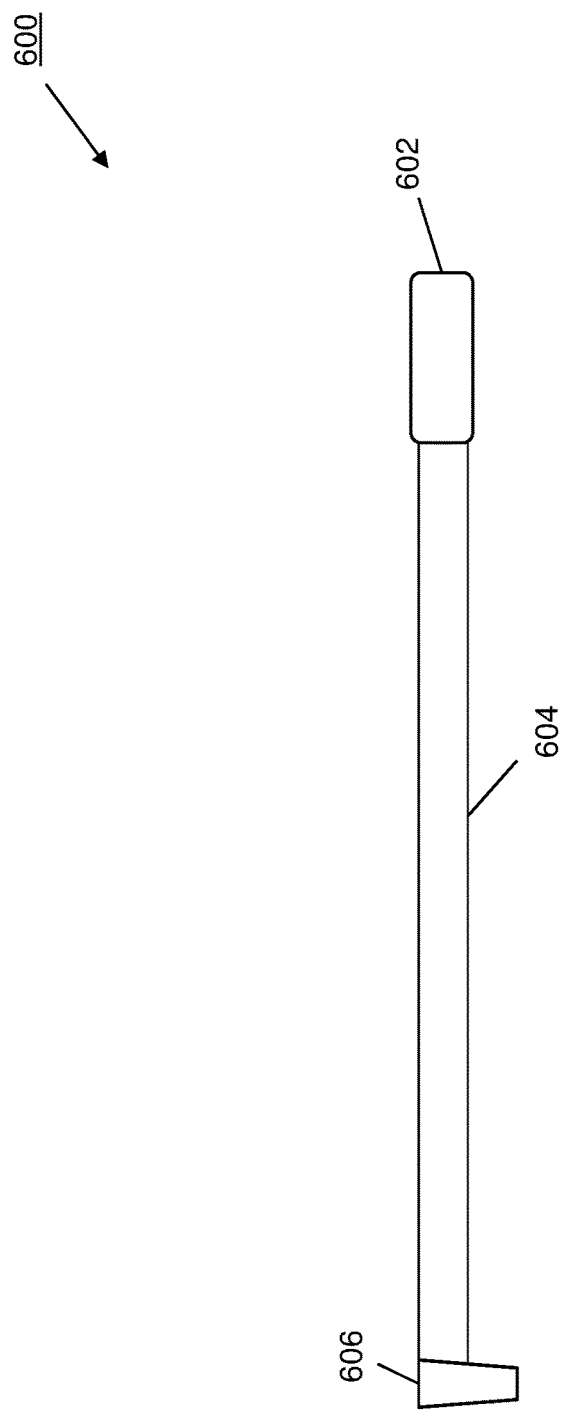
FIG. 6A is a side view illustrating an embodiment of a cable release system provided according to the teachings of the present disclosure.

Referring now to FIG. 6A, and embodiment of a cable release system 600 provided according to the teachings of the present disclosure is illustrated. In the embodiment illustrated in FIG. 6A, the cable release system 600 includes a handle 602. An elongated base 604 extends from the handle 602 and, as discussed below, includes a length that is approximately as long as the cable connector base 404 on the cable connector system 400 discussed above with reference to FIGS. 4A and 4B. An actuating member 606 is located on the elongated base 604 opposite the handle 602, and in the illustrated embodiment extends substantially perpendicularly from the elongated base 604. In a specific example, the handle 602, the elongated base 604, and/or the actuating member 606 may be provided by carbon fiber materials, aluminum alloy materials, nan-cellulose materials, and/or other relatively high strength materials that one of skill in the art in possession of the present disclosure would recognize as allowing for the functionality discussed below, and while a simplified example is illustrated in FIG. 6A, one of skill in the art in possession of the present disclosure will appreciate how any of the handle 602, the elongated base 604, and/or the actuating member 606 may be provided with dimensions and/or features that enable for the cable release functionality described in further detail below.

Figure 6B:
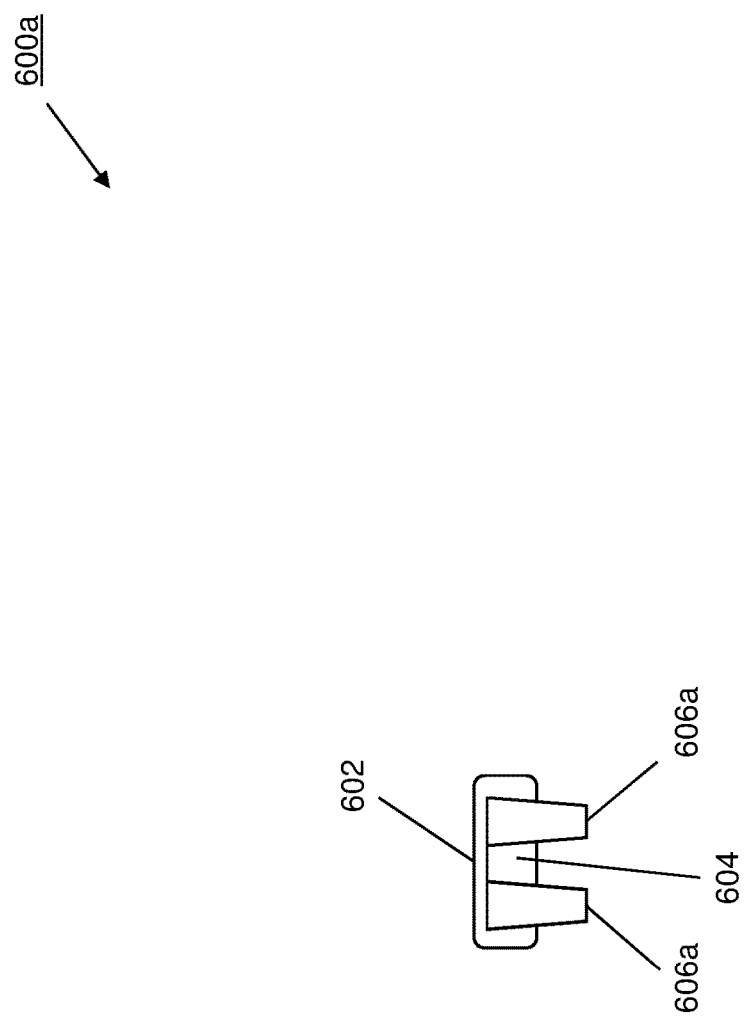
FIG. 6B is a front view illustrating an embodiment of the cable release system of FIG. 6A.

FIG. 6B illustrates an embodiment of a dual cable connector cable release system 600a that includes similar features as the cable release system 600 and, as such, those features are provided with the same reference numbers. Thus, the dual cable connector cable release system 600a includes the handle 602 and the elongated base 604 included on the cable release system 600, but with the actuation member 606 of the cable release system 600 provided by dual actuation members 606a that are spaced apart from each other on the elongated base 604. As discussed below, the dual actuation members 606a on the dual cable connector cable release system 600a may be utilized to perform the cable release functionality of the present disclosure on the cable connector system 400 discussed above with reference to FIGS. 4A and 4B when it is connected to the computing system 200 of FIG. 2.

Figure 6C:
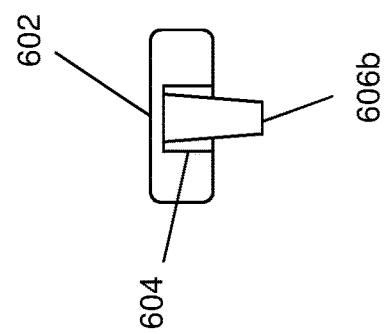
FIG. 6C is a front view illustrating an embodiment of the cable release system of FIG. 6A.

FIG. 6C illustrates an embodiment of a transceiver device cable release system 600b that includes similar features as the cable release system 600 and, as such, those features are provided with the same reference numbers. Thus, the transceiver device cable release system 600b includes the handle 602 and the elongated base 604 included on the cable release system 600, but with the actuation member 606 of the cable release system 600 provided by a single actuation member 606b on the elongated base 604. As discussed below, the single actuation member 606b on the transceiver device cable release system 600b may be utilized to perform the cable release functionality of the present disclosure for the cable connector system 500 discussed above with reference to FIG. 5 when it is connected to the computing system 300 of FIG. 3.

Figure 7A:
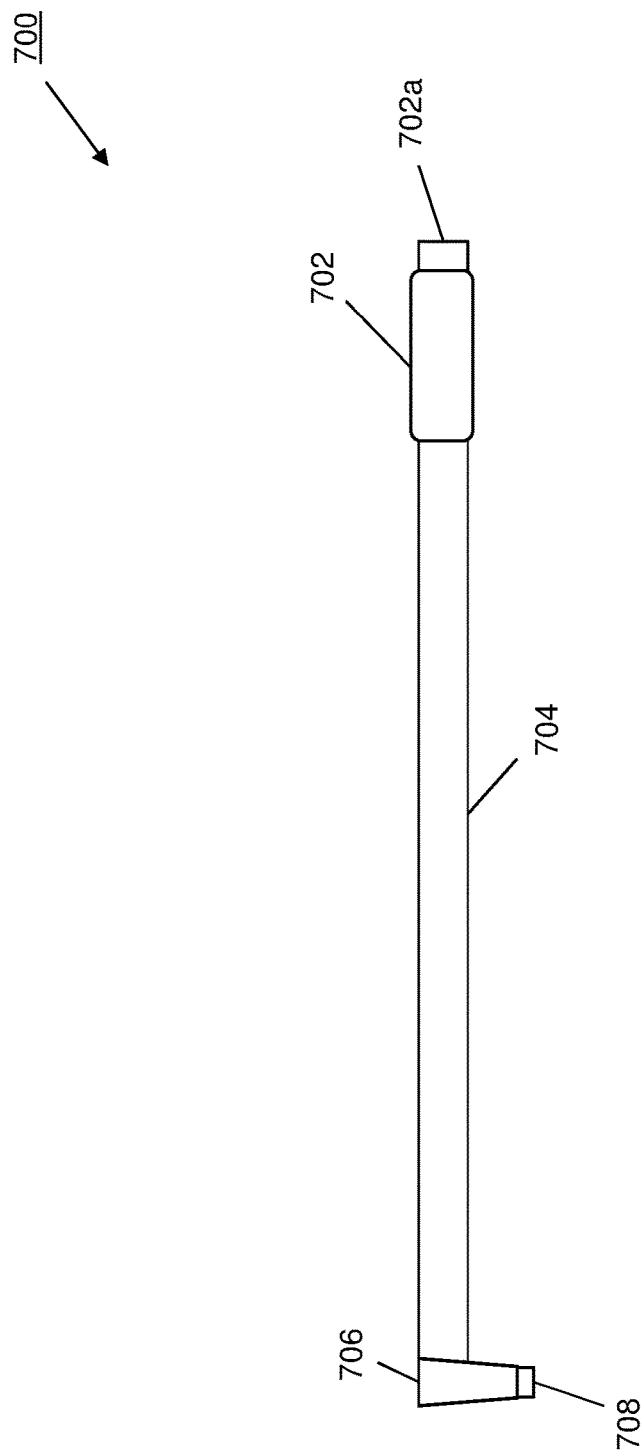
FIG. 7A is a side view illustrating an embodiment of a cable release system provided according to the teachings of the present disclosure.
Figure 7B:
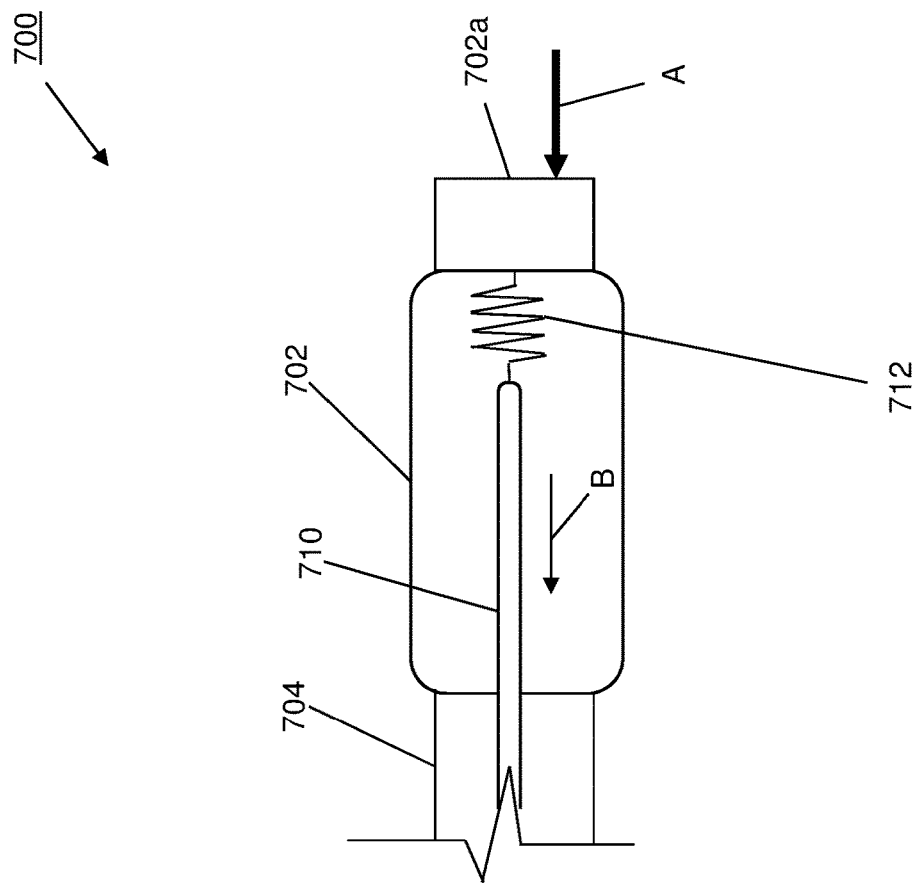
FIG. 7B is a schematic cross-sectional view illustrating an embodiment of the cable release system of FIG. 7A.
Figure 7B:
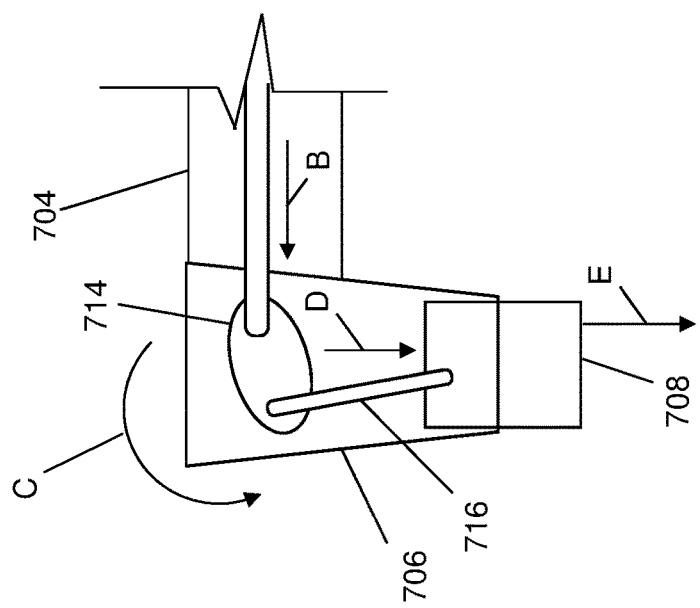

Referring now to FIGS. 7A and 7B, and embodiment of a cable release system 700 provided according to the teachings of the present disclosure is illustrated. In the embodiment illustrated in FIG. 7A, the cable release system 700 includes a handle 702 having a trigger element 702a. An elongated base 704 extends from the handle 702 and, as discussed below, includes a length that is approximately as long as the cable connector base 504 on the cable connector system 500 discussed above with reference to FIG. 5. An actuating member 706 houses an actuating element 708 and is located on the elongated base 704 opposite the handle 702, and in the illustrated embodiment extends substantially perpendicularly from the elongated base 704. In a specific example, the handle 702, the elongated base 704, and/or the actuating member 706 may be provided by carbon fiber materials, aluminum alloy materials, nan-cellulose materials, and/or other relatively high strength materials that one of skill in the art in possession of the present disclosure would recognize as allowing for the functionality discussed below, and while a simplified example is illustrated in FIGS. 7A and 7B, one of skill in the art in possession of the present disclosure will appreciate how any of the handle 702, the trigger element 702a, the elongated base 704, the actuating member 706, and/or the actuating element 708 may be provided with dimensions and/or features that enable the cable release functionality described in further detail below.

FIG. 7B illustrates how the trigger element 702a on the handle 702 may be coupled to the actuating element 708 on the actuating member 706 in order to allow the trigger 702a to be used to actuate the actuating element 708 to provide the cable release functionality discussed below. For example, the cable release system 700 may include a first linkage 710 that extends through the elongated base 704 and a portion of the handle 702, and that is coupled to the trigger element 702a by a spring 712 or other resilient member known in the art. A translator member 714 is located in the actuating member 706 and is coupled to the first linkage 710 opposite the spring 712, and a second linkage 716 is coupled to each of the translator member 714 and the actuating element 708. As illustrated in FIG. 7B, a force A on the trigger element 702a will translate to the spring 712 to cause the first linkage 710 to move in a direction B, resulting in the translator member 714 rotating in a direction C to cause the second linkage 716 to move in a direction D, further causing the actuation element 708 to move in a direction E and out of the actuation member 706. However, while a specific coupling between the trigger element 702a and the actuating element 708 is illustrated and described, one of skill in the art in possession of the present disclosure will appreciate that a variety of couplings may be provided to enable the trigger element/actuating element functionality discussed below while remaining within the scope of the present disclosure as well.

Figure 7C:
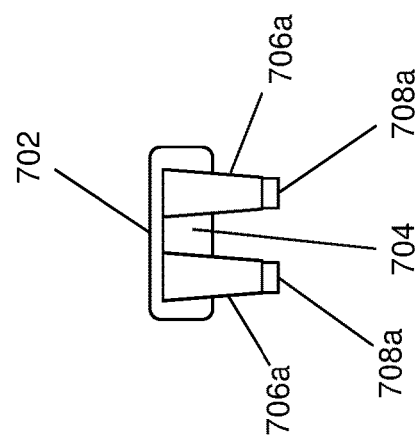
FIG. 7C is a front view illustrating an embodiment of the cable release system of FIGS. 7A and 7B.

FIG. 7C illustrates an embodiment of a dual cable connector cable release system 700a that includes similar features as the cable release system 700 and, as such, those features are provided with the same reference numbers. Thus, the dual cable connector cable release system 700a includes the handle 702 and the elongated base 704 included on the cable release system 700, but with the actuation member 606 of the cable release system 600 provided by a dual actuation members 706a that are spaced apart from each other on the elongated base 704 and that include respective actuation elements 708a that may be coupled to the trigger element 702a (not visible in FIG. 7C) in the same manner as discussed above with reference to FIG. 7B. As discussed below, the actuation elements 708a on the dual actuation members 706a on the dual cable connector cable release system 700a may be utilized to perform the cable release functionality of the present disclosure on the cable connector system 400 discussed above with reference to FIGS. 4A and 4B when it is connected to the computing system 200 of FIG. 2.

Figure 7D:
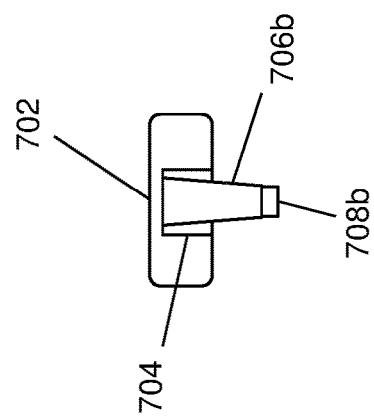
FIG. 7D is a front view illustrating an embodiment of the cable release system of FIGS. 7A and 7B.

FIG. 7D illustrates an embodiment of a transceiver device cable release system 700b that includes similar features as the cable release system 700 and, as such, those features are provided with the same reference numbers. Thus, the transceiver device cable release system 700b includes the handle 702 and the elongated base 704 included on the cable release system 700, but with the actuation member 606 of the cable release system 600 provided by a single actuation member 706b that includes an actuation element 708b that may be coupled to the trigger element 702a (not visible in FIG. 7C) in the same manner as discussed above with reference to FIG. 7B. As discussed below, the single actuation member 706b on the transceiver device cable release system 700b may be utilized to perform the cable release functionality of the present disclosure for the cable connector system 500 discussed above with reference to FIG. 5 when it is connected to the computing system 300 of FIG. 3.

Figure 8:
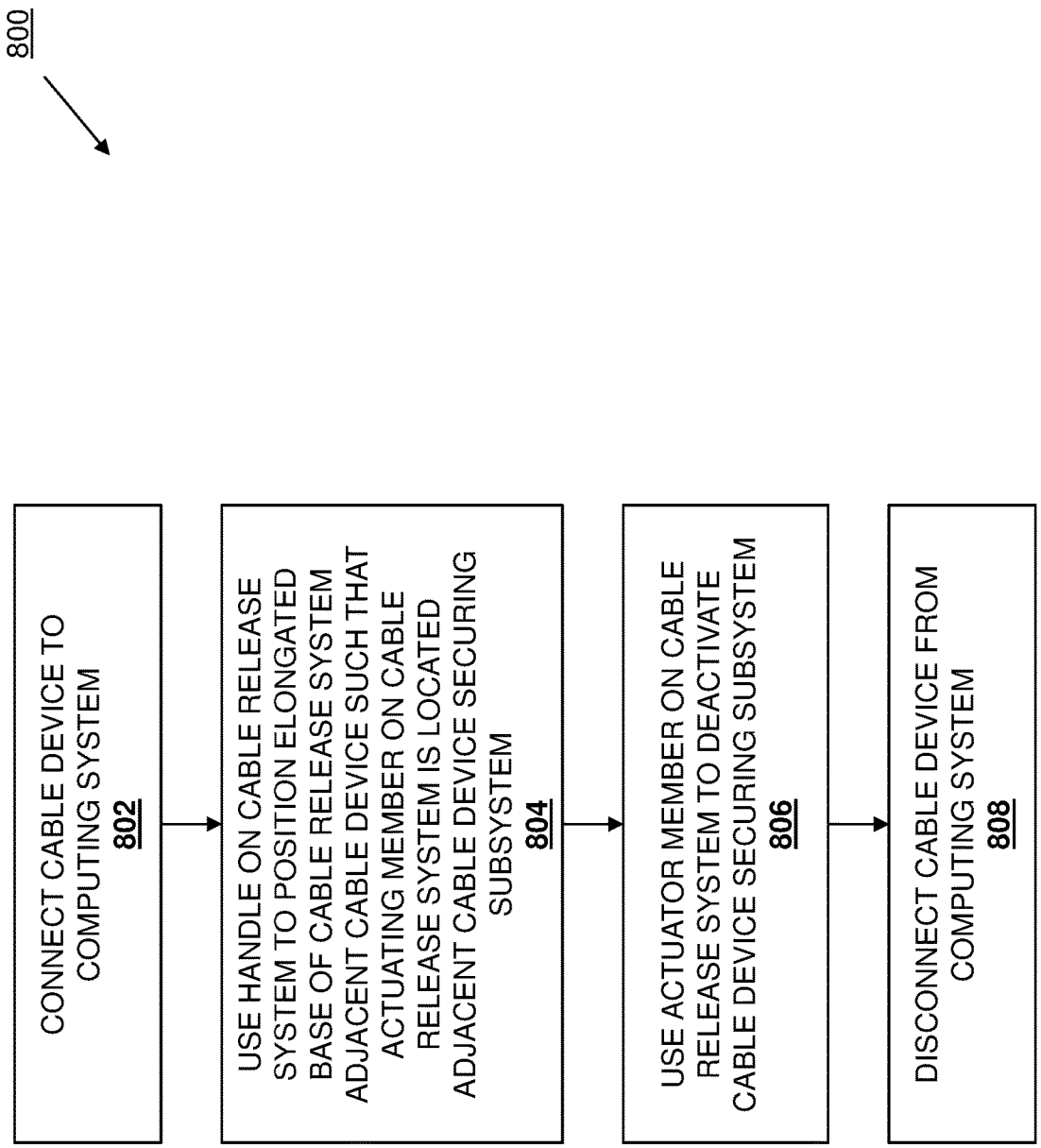
FIG. 8 is a flow chart illustrating an embodiment of a method for releasing a cable.

Referring now to FIG. 8, an embodiment of a method 800 for releasing a cable is illustrated. As discussed below, the systems and methods of the present disclosure provide for the release of cables from a computing system via the use of a cable release system that may be used to actuate a cable connector release subsystem connecting any cable connector to the computing system. For example, the cable release system of the present disclosure may include a handle. An elongated base extends from the handle and includes a length that allows the handle to be held adjacent a cable connector distal end of a cable connector that is connected to a computing device while the elongated base extends adjacent the cable connector and an elongated base distal end of the elongated base is located adjacent a securing latch on the cable connector. An actuating member is located on the elongated base distal end of the elongated base and is configured to actuate the securing latch on the cable connector when the elongated base distal end of the elongated base is located adjacent the securing latch on the cable connector. As such, the deficiencies of conventional "pull-tab" release mechanisms on cable connector systems are eliminated, reducing support calls, system down time, and/or other associated costs.

Figure 9:
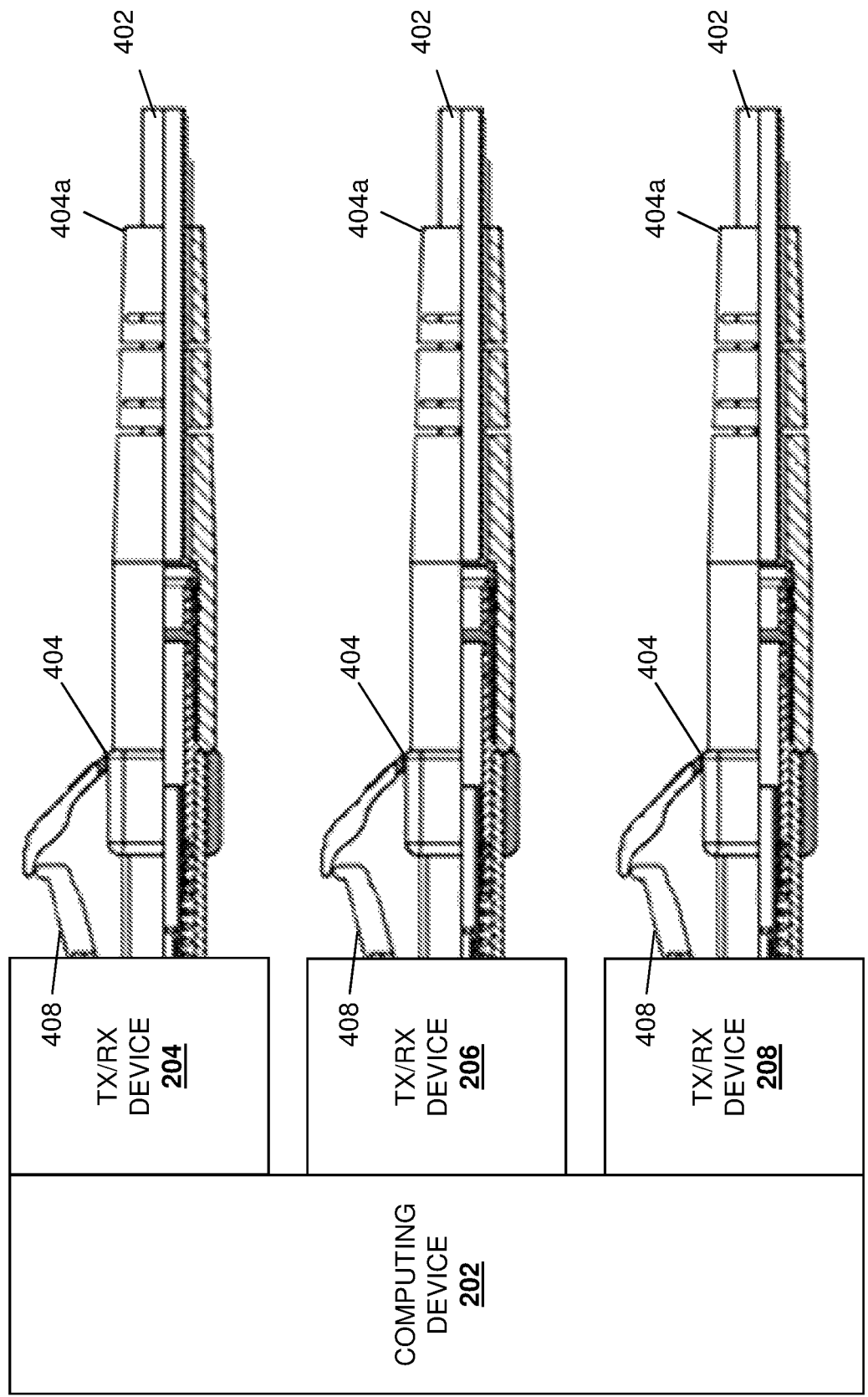
FIG. 9 is a side schematic view illustrating an embodiment of a plurality of cable connector systems of FIGS. 4A and 4B connected to the computing system of FIG. 2.

The method 800 begins at block 802 where a cable connector is connected to a computing system. As illustrated in FIG. 9, in an embodiment of block 802, a plurality of the cable connector systems of 400 of FIGS. 4A and 4B may connected to the computing system 200 of FIG. 2 by, for example, positioning each cable connector system 400 adjacent a respective transceiver device 204, 206, and 208 such that the cable connectors 406 on those cable connector systems 400 are positioned immediately adjacent that respective transceiver device 204, 206, and 208. Each cable connector system 400 may then be moved towards the respective transceiver device 204, 206, and 208 such that the cable connectors 406 on those cable connector systems 400 engage a transceiver connector on the respective transceiver devices 204, 206, and 208, and the securing latches 408 on those cable connector systems 400 engage the respective transceiver devices 204, 206, and 208 to secure the cable connector systems 400 in those respective transceiver devices 204, 206, and 208, as illustrated in FIG. 9. As will be appreciated by one of skill in the art in possession of the present disclosure, the computing device 202 may then transmit/receive data via each transceiver device 204, 206, and 208, the cable connector systems 400 connected to those transceiver devices 204, 206, and 208, and the cabling 402 on the cable connector systems 400.

Figure 10:
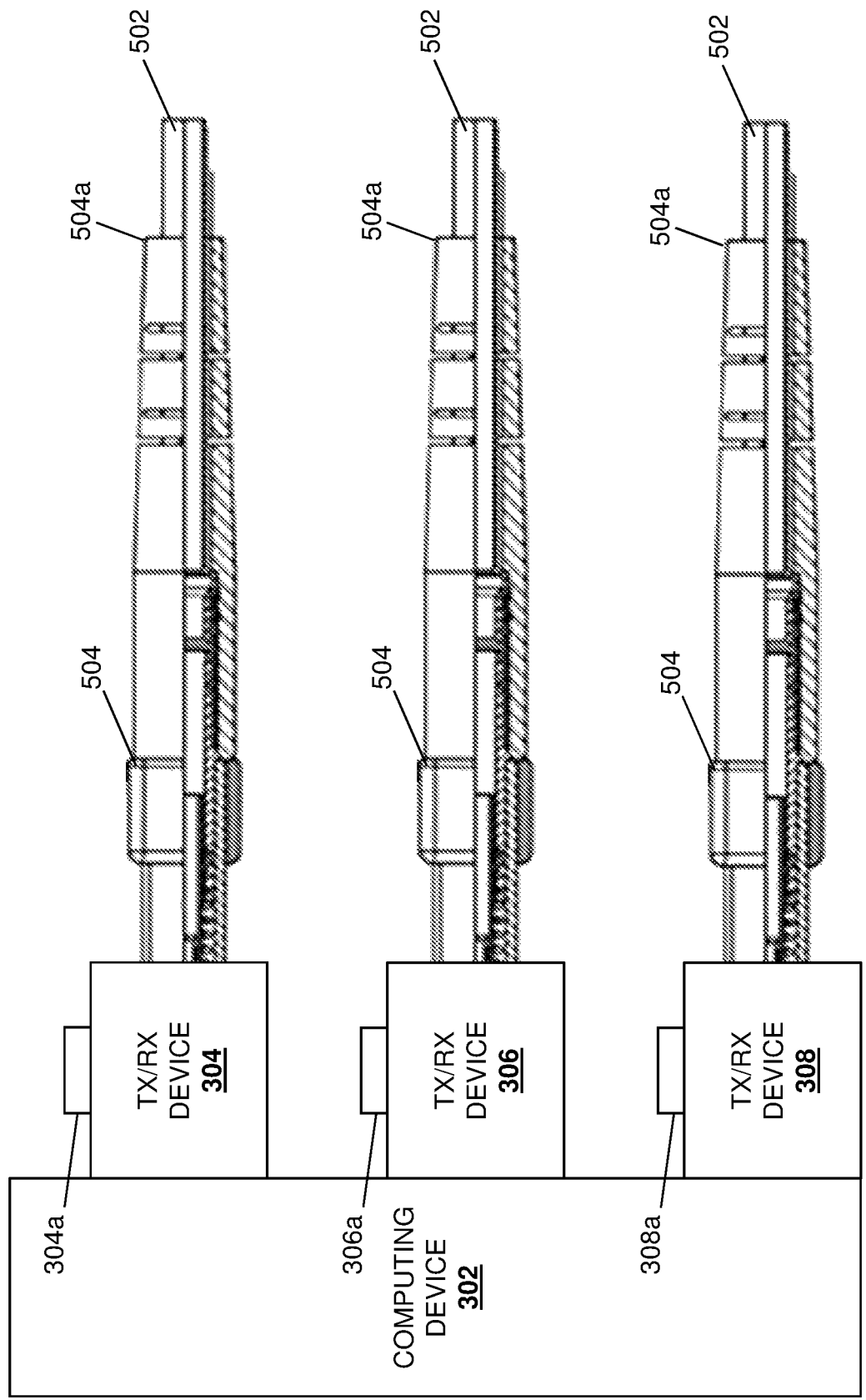
FIG. 10 is a side schematic view illustrating an embodiment of a plurality of cable connector systems of FIG. 5 connected to the computing system of FIG. 3.

As illustrated in FIG. 10, in an embodiment of block 802, a plurality of the cable connector systems of 500 of FIG. 5 may connected to the computing system 300 of FIG. 3 by, for example, positioning each cable connector system 500 adjacent a respective transceiver device 304, 306, and 308 such that the cable connectors 506 on those cable connector systems 500 are positioned immediately adjacent that respective transceiver device 304, 306, and 308. Each cable connector system 500 may then be moved towards the respective transceiver device 304, 306, and 308 such that the cable connectors 506 on those cable connector systems 500 engage a transceiver connector on the respective transceiver devices 304, 306, and 308, as well as engage the cable connector securing subsystems in those transceiver devices 304, 306, and 308 to secure the cable connector systems 600 in the transceiver devices 304, 306, and 308, as illustrated in FIG. 10. As will be appreciated by one of skill in the art in possession of the present disclosure, the computing device 302 may then transmit/receive data via each transceiver device 304, 306, and 308, the cable connector systems 500 connected to those transceiver devices 304, 306, and 308, and the cabling 502 on the cable connector systems 500.

As will be appreciated by one of skill in the art in possession of the present disclosure, the vertically "stacked" transceiver device/cable connector systems illustrated in FIGS. 9 and 10 may also include horizontally "stacked" transceiver device/cable connector systems (e.g., the "column" of vertically "stacked" transceiver device/cable connector systems illustrated in FIGS. 9 and 10 may be repeated adjacent each other to provide a grid of transceiver device/cable connector systems that are closely positioned to each other/densely populated on the computing system). As such, the ability to access the securing latches 408 on any particular cable connector system 400 may be restricted by adjacent cable connector systems 400, and the ability to access the release buttons 304a-308a on any particular transceiver device 306-308 may be restricted by adjacent cable connector systems 500. As discussed below, the cable release system of the present disclosure allows for the accessing of the security latches 408 on the cable connector systems 400 and the release buttons 304a-308a on the transceiver devices 306-308 without the negative issues associated with conventional cable connector release systems.

Figure 11A:
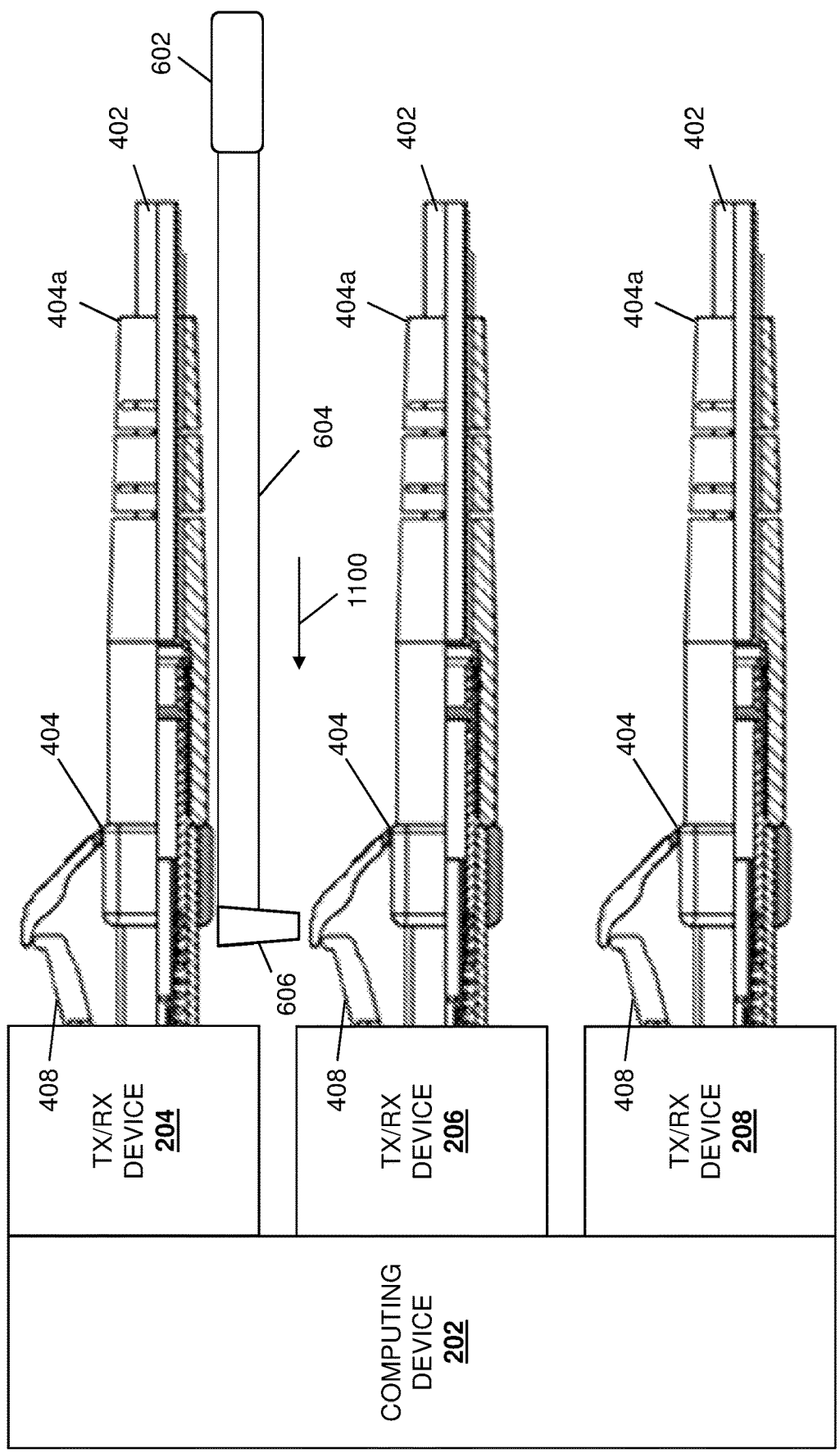
FIG. 11A is a side schematic view illustrating the cable release system of FIGS. 6A and 6B being utilized with the cable connector systems and computing system of FIG. 9 during the method of FIG. 8.
Figure 11B:
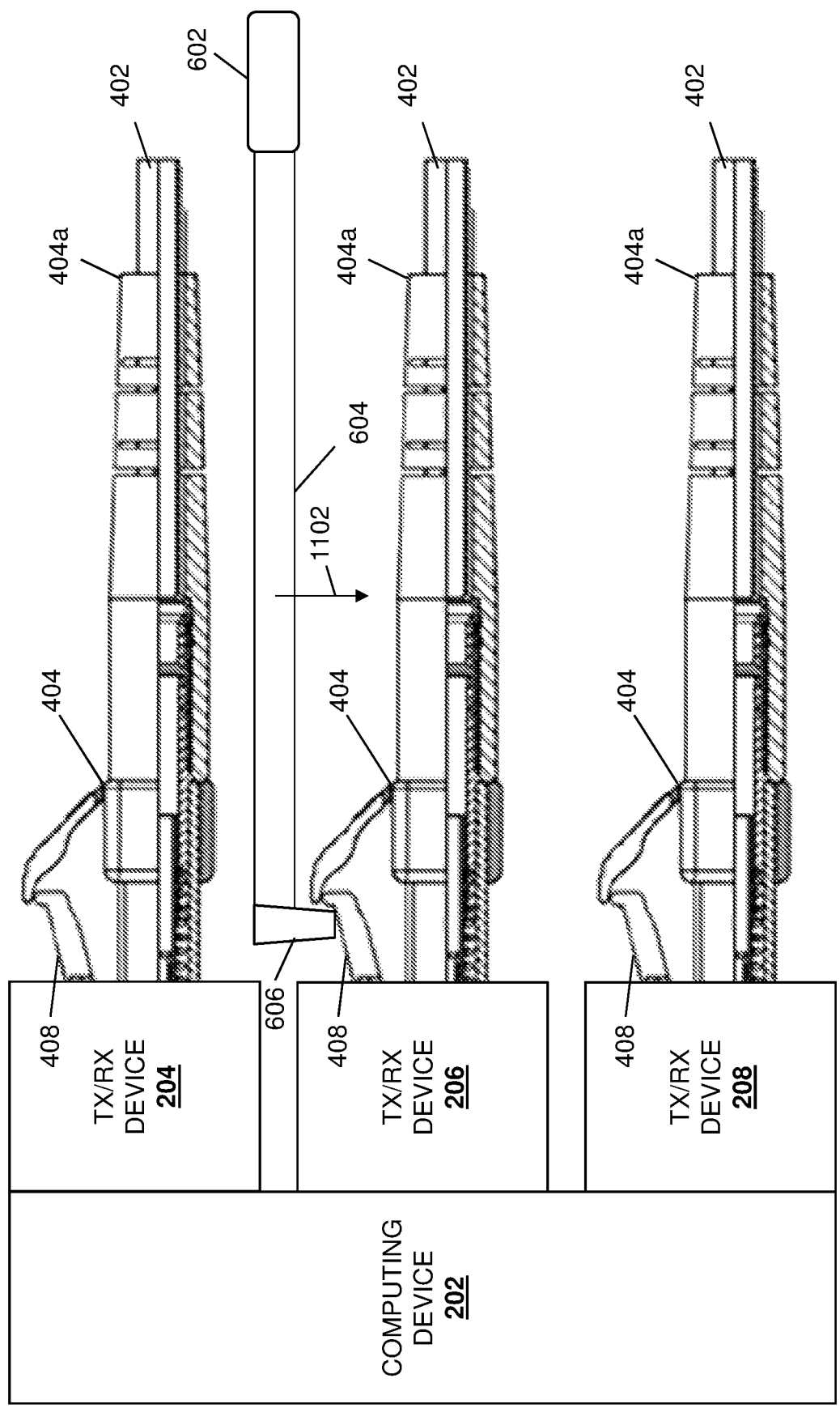
FIG. 11B is a side schematic view illustrating the cable release system of FIGS. 6A and 6B being utilized with the cable connector systems and computing system of FIG. 9 during the method of FIG. 8.

The method 800 then proceeds to block 804 where a handle on a cable release system is used to position an elongated base of the cable release system adjacent the cable connector such that an actuating member on the cable release system is located adjacent a cable connector securing subsystem. With reference to FIGS. 11A and 11B, in an embodiment of block 804, the handle 602 on the cable release system 600 may be used to position the elongated base 604 and actuation member 606 on the cable release system 600 between the cable connector system 400 connected to the transceiver device 204 and the cable connector system 400 connected to the transceiver device 206, as illustrated in FIG. 11A. The handle 602 on the cable release system 600 may then be used to move the elongated base 604 and actuation member 606 on the cable release system 600 in a direction 1100 until the actuation member 606 (e.g., the dual actuation members 606a on the dual cable connector cable release system 600a of FIG. 6B in this example) is located immediately adjacent the securing latches 408 on the cable connector system 400 connected to the transceiver device 206, as illustrated in FIG. 11B.

Figure 12A:
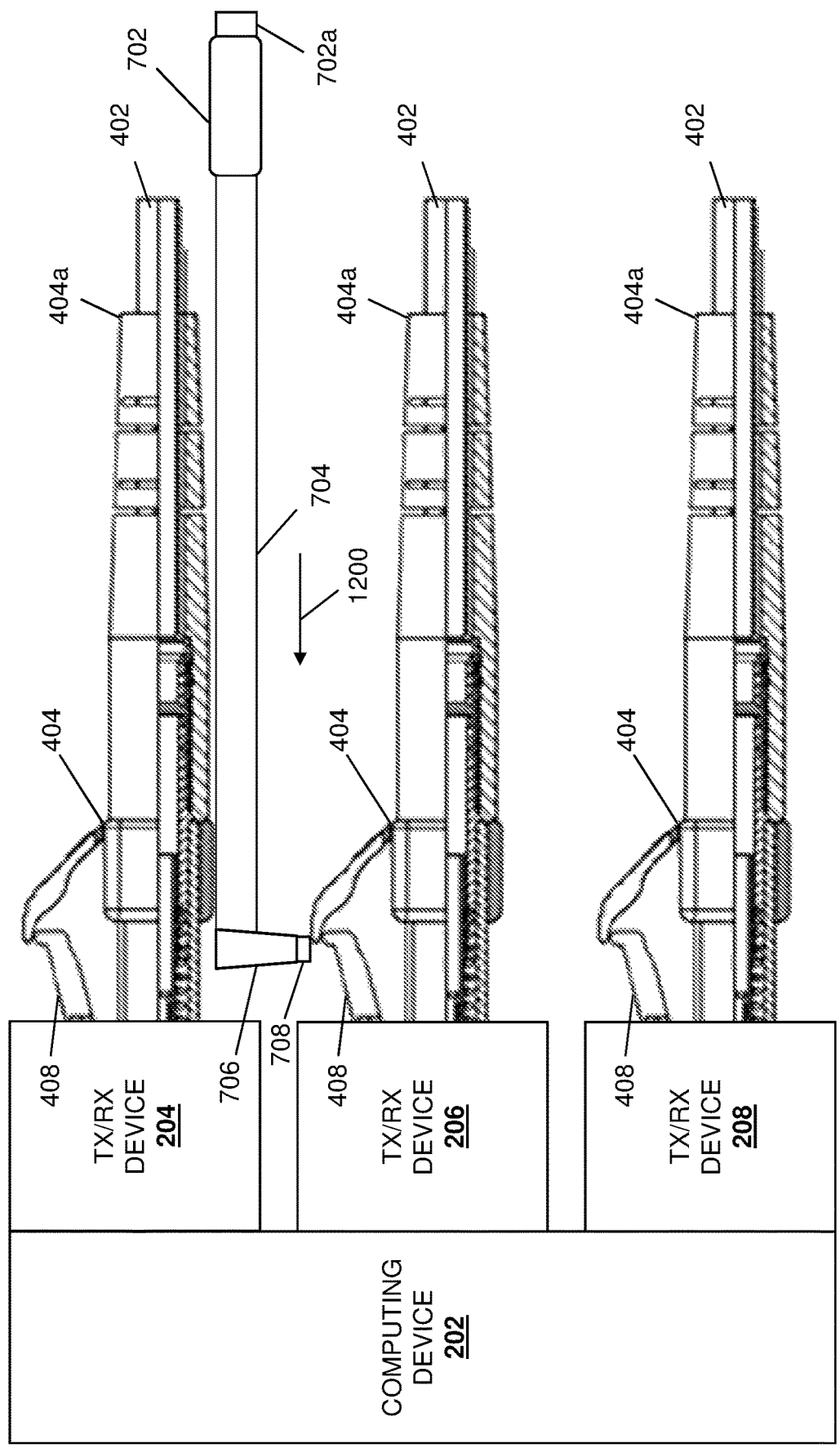
FIG. 12A is a side schematic view illustrating the cable release system of FIGS. 7A, 7B, and 7C being utilized with the cable connector systems and computing system of FIG. 9 during the method of FIG. 8.
Figure 12B:
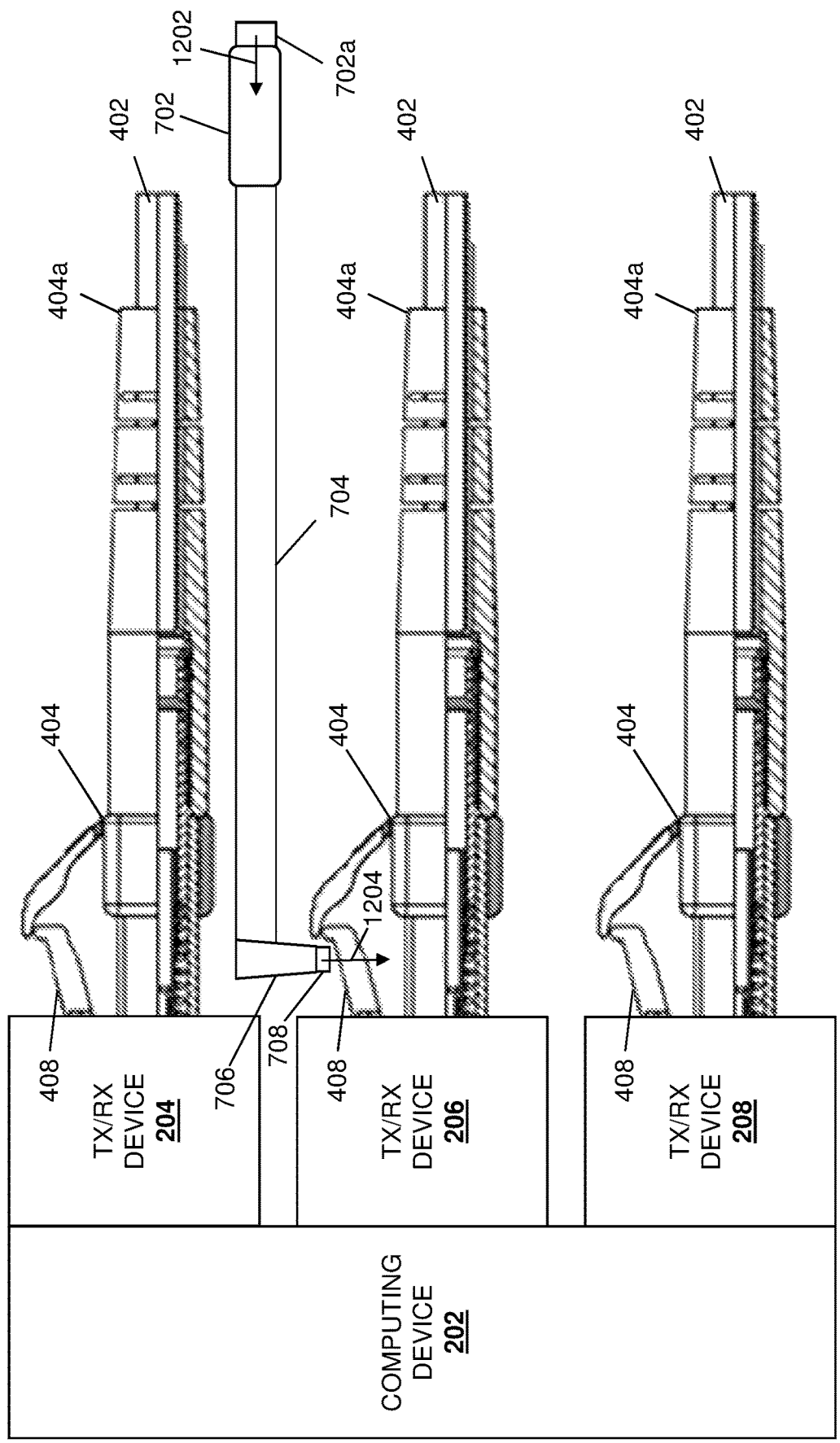
FIG. 12B is a side schematic view illustrating the cable release system of FIGS.

With reference to FIGS. 12A and 12B, in an embodiment of block 804, the handle 702 on the cable release system 700 may be used to position the elongated base 704 and actuation member 706 on the cable release system 700 between the cable connector system 400 connected to the transceiver device 204 and the cable connector system 400 connected to the transceiver device 206, as illustrated in FIG. 12A. The handle 702 on the cable release system 700 may then be used to move the elongated base 704 and actuation member 706 on the cable release system 700 in a direction 1200 until the actuation element 708 on the actuation member 706 (e.g., the actuation elements 708a housed in the dual actuation members 706a on the dual cable connector cable release system 700a of FIG. 7C in this example) is located immediately adjacent the securing latches 408 on the cable connector system 400 connected to the transceiver device 206, as illustrated in FIG. 12B.

Figure 13A:
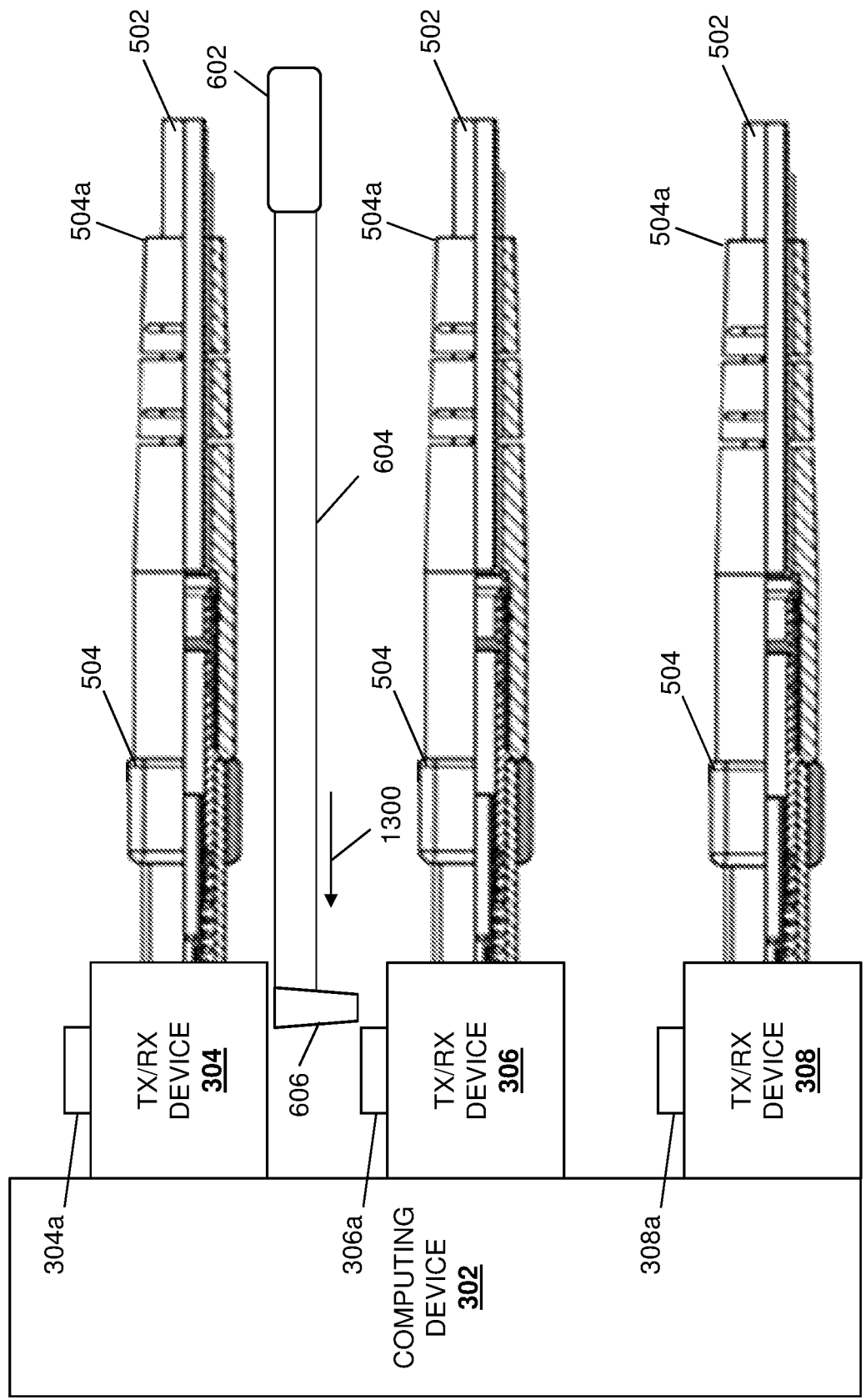
FIG. 13A is a side schematic view illustrating the cable release system of FIGS. 6A and 6C being utilized with the cable connector systems and computing system of FIG. 10 during the method of FIG. 8.
Figure 13B:
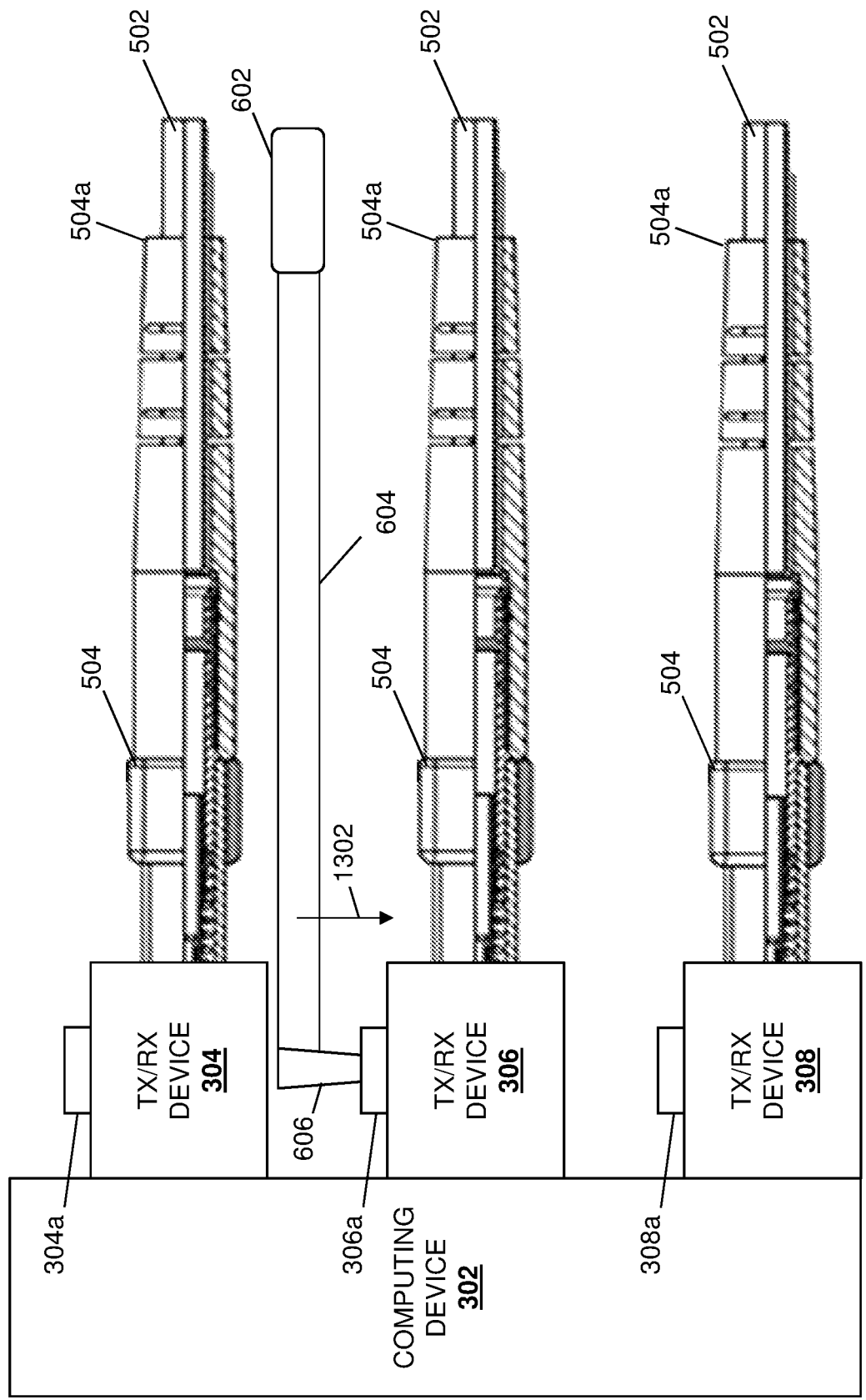
FIG. 13B is a side schematic view illustrating the cable release system of FIGS. 6A and 6C being utilized with the cable connector systems and computing system of FIG. 10 during the method of FIG. 8.

With reference to FIGS. 13A and 13B, in an embodiment of block 804, the handle 602 on the cable release system 600 may be used to position the elongated base 604 and actuation member 606 on the cable release system 600 between the cable connector system 500 connected to the transceiver device 304 and the cable connector system 500 connected to the transceiver device 306, as illustrated in FIG. 13A. The handle 602 on the cable release system 600 may then be used to move the elongated base 604 and actuation member 606 on the cable release system 600 in a direction 1300 until the actuation member 606 (e.g., the single actuation member 606b on the transceiver device cable release system 600b of FIG. 6C in this example) is located immediately adjacent the release button 306a on the transceiver device 306, as illustrated in FIG. 13B.

Figure 14A:
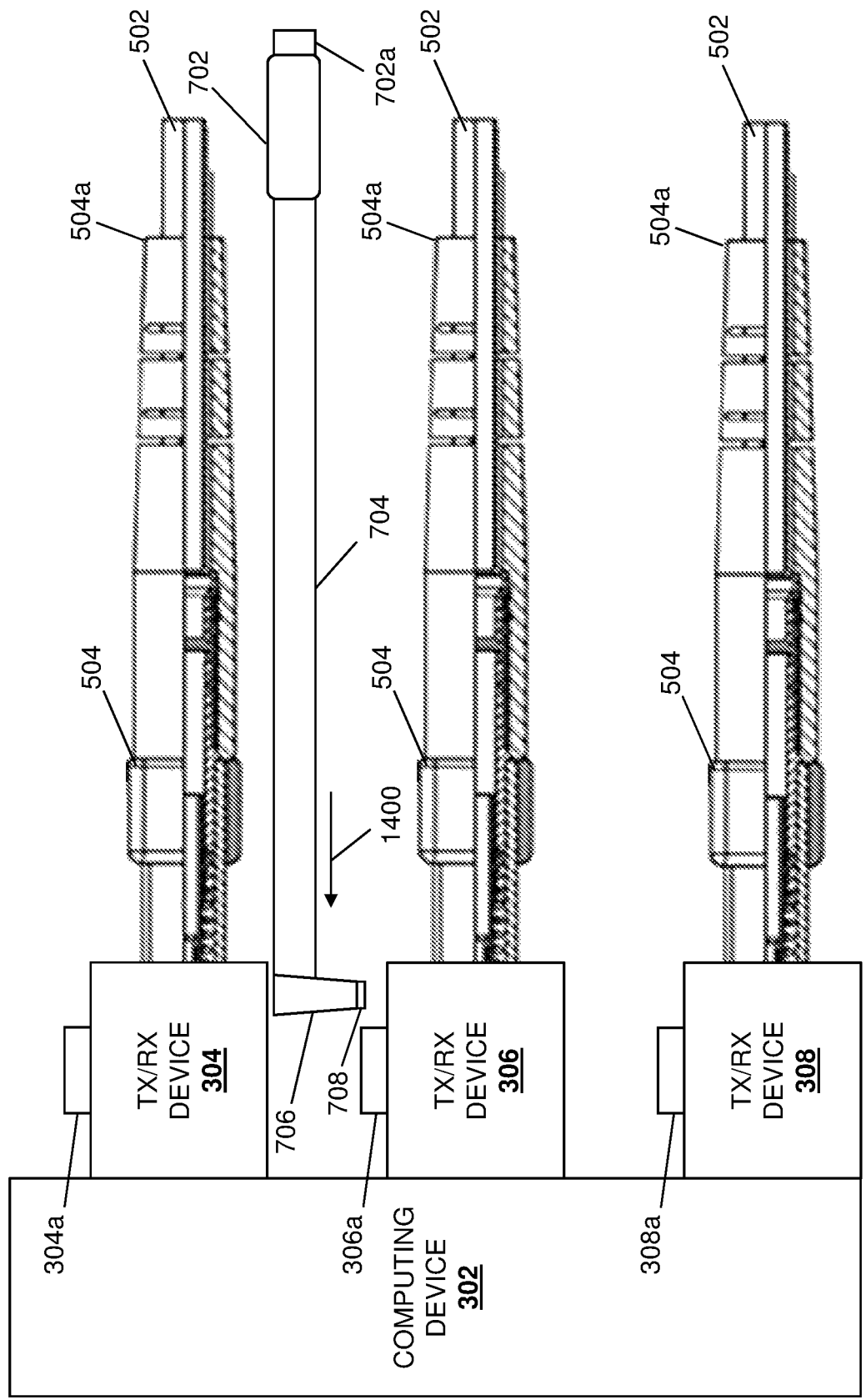
FIG. 14A is a side schematic view illustrating the cable release system of FIGS. 7A, 7B, and 7D being utilized with the cable connector systems and computing system of FIG. 10 during the method of FIG. 8.
Figure 14B:
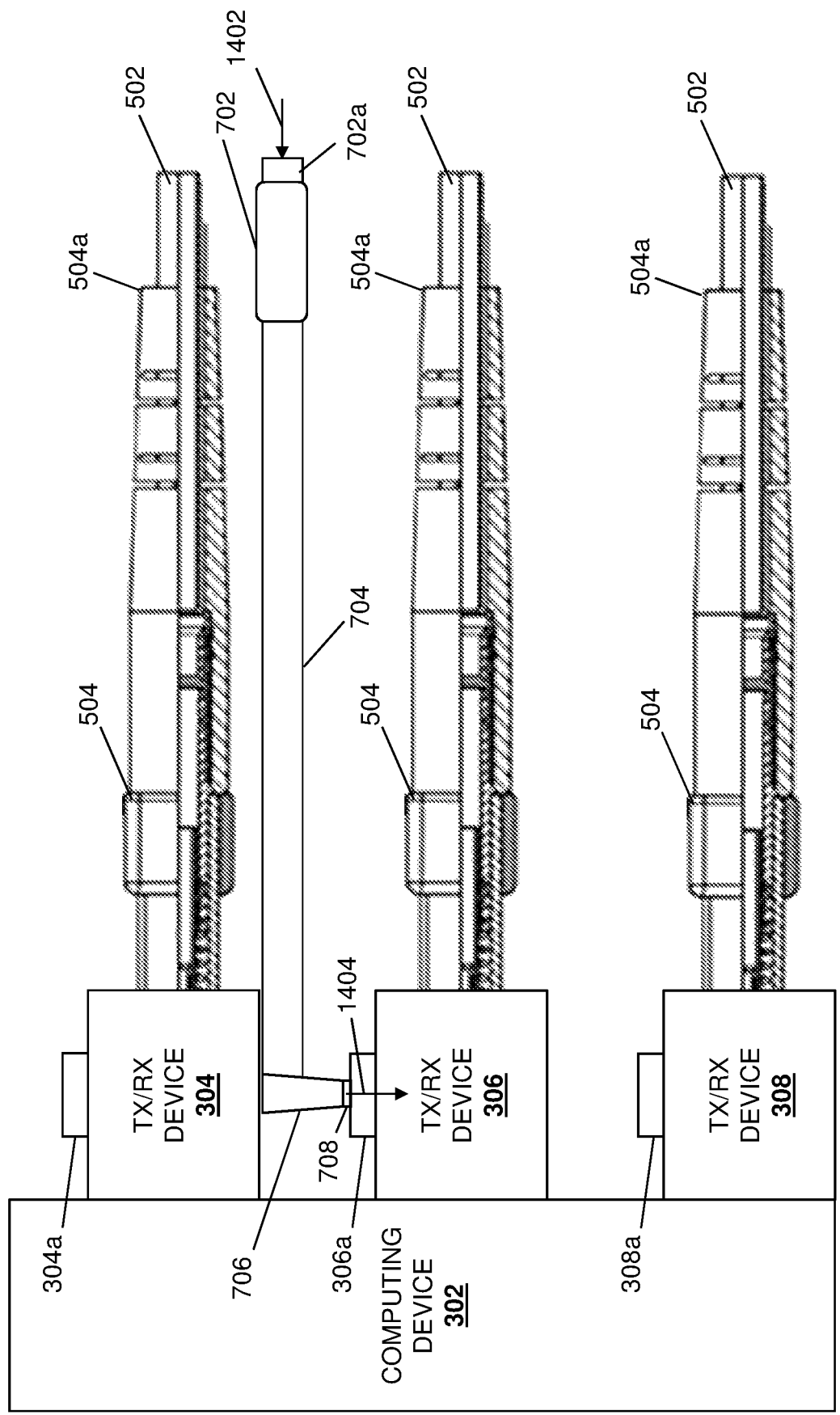
FIG. 14B is a side schematic view illustrating the cable release system of FIGS. 7A, 7B, and 7D being utilized with the cable connector systems and computing system of FIG. 10 during the method of FIG. 8.

With reference to FIGS. 14A and 14B, in an embodiment of block 804, the handle 702 on the cable release system 700 may be used to position the elongated base 704 and actuation member 706 on the cable release system 700 between the cable connector system 500 connected to the transceiver device 304 and the cable connector system 500 connected to the transceiver device 306, as illustrated in FIG. 14A. The handle 702 on the cable release system 700 may then be used to move the elongated base 704 and actuation member 706 on the cable release system 700 in a direction 1400 until the actuation element 708 on the actuation member 706 (e.g., the actuation element 708b housed in the single actuation member 706b on the transceiver device cable release system 700b of FIG. 7D in this example) is located immediately adjacent the release button 306a on the transceiver device 306, as illustrated in FIG. 14B.

Figure 11C:
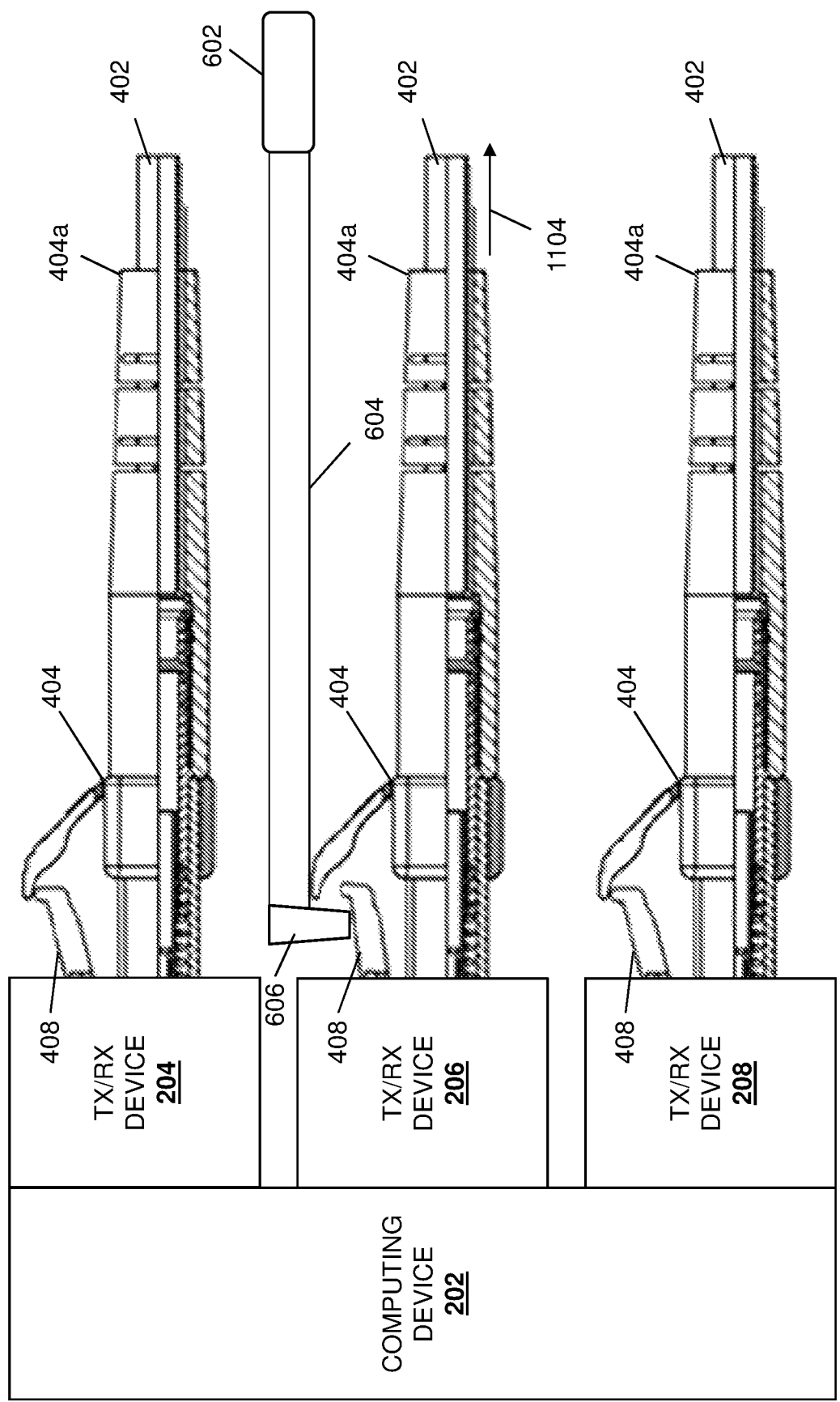
FIG. 11C is a side schematic view illustrating the cable release system of FIGS. 6A and 6B being utilized with the cable connector systems and computing system of FIG. 9 during the method of FIG. 8.

The method 800 then proceeds to block 806 where the actuating member on the cable release system is used to deactivate the cable connector securing subsystem. With reference to FIGS. 11B and 11C, in an embodiment of block 806, the handle 602 on the cable release system 600 may then be used to move the elongated base 604 and actuation member 606 on the cable release system 600 in a direction 1102 such that the actuation member 606 (e.g., the dual actuation members 606a on the dual cable connector cable release system 600a of FIG. 6B in this example) engages and actuates the securing latches 408 on the cable connector system 400 such that those securing latches 408 no longer engage the transceiver device 206, illustrated in FIG. 11C.

Figure 12C:
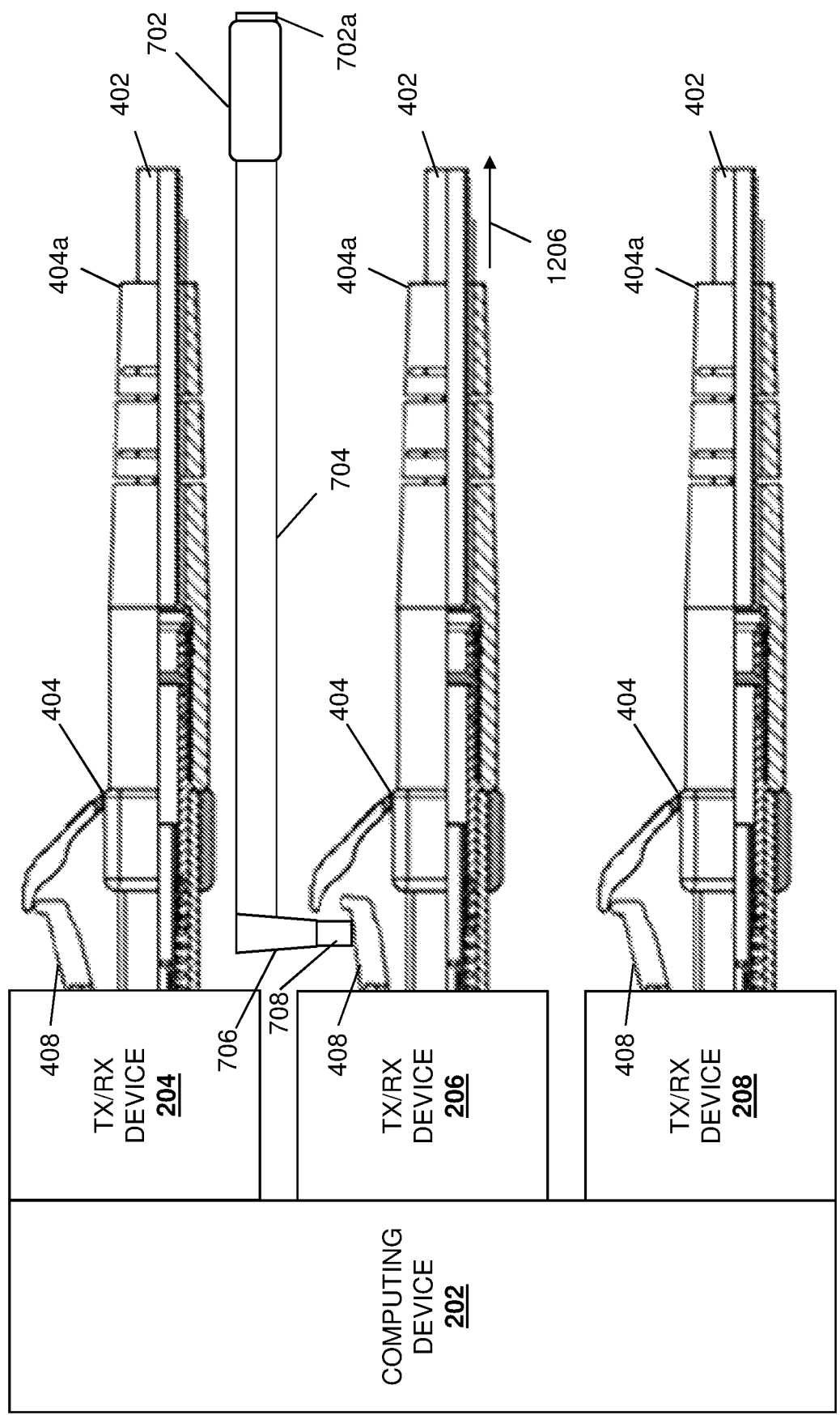
FIG. 12C is a side schematic view illustrating the cable release system of FIGS.

With reference to FIGS. 12B and 12C, in an embodiment of block 806, the trigger element 702a on the handle 702 of the cable release system 700 may then be moved in a direction 1202, which as discussed above may cause the actuation element 708 in the actuation member 706 (e.g., the actuation elements 708a on the dual actuation members 706a on the dual cable connector cable release system 700a of FIG. 7C in this example) to extend out of the actuation member 706 to engage and actuate the securing latches 408 on the cable connector system 400 such that those securing latches 408 no longer engage the transceiver device 206, illustrated in FIG. 12C.

Figure 13C:
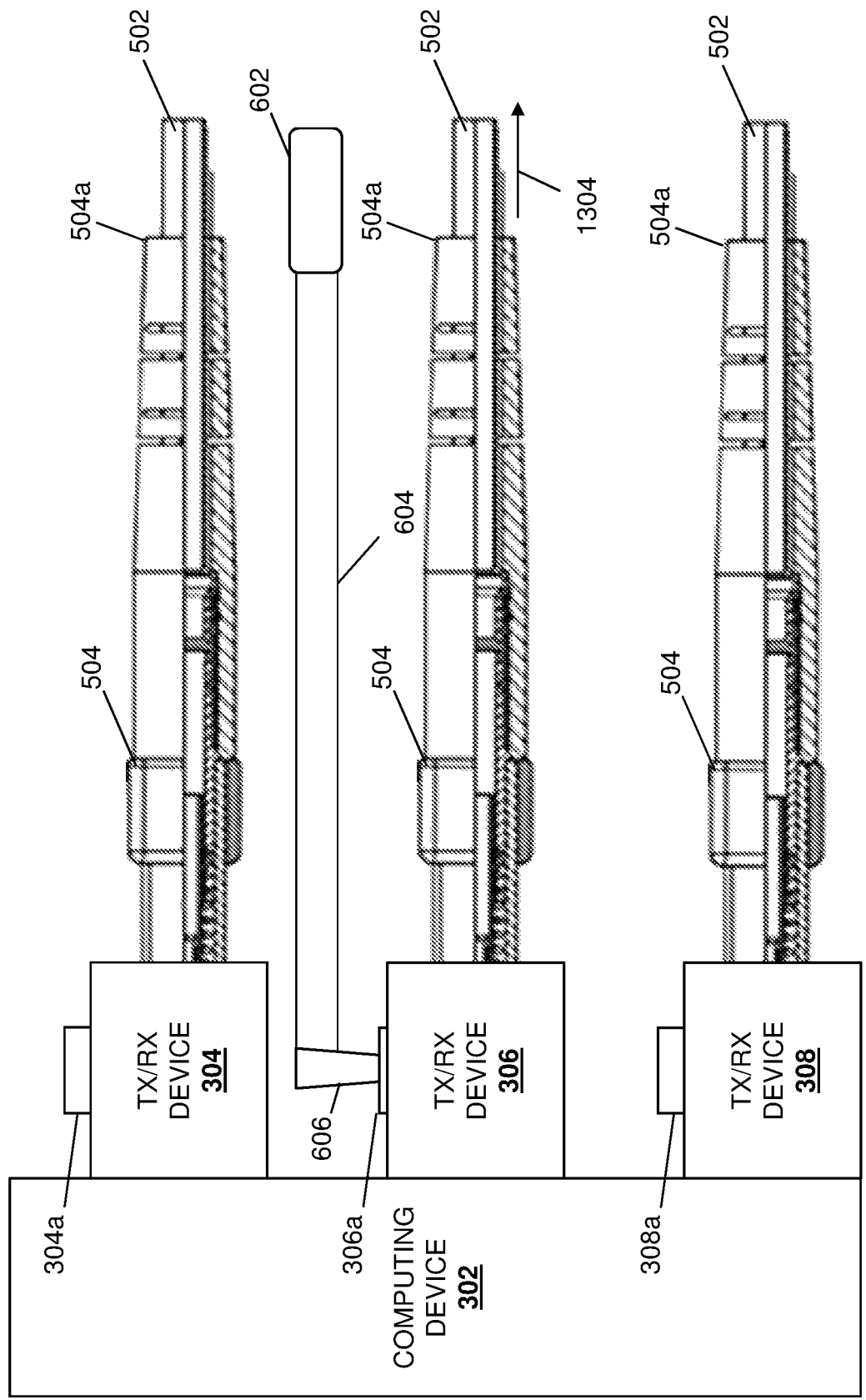
FIG. 13C is a side schematic view illustrating the cable release system of FIGS. 6A and 6C being utilized with the cable connector systems and computing system of FIG. 10 during the method of FIG. 8.

With reference to FIGS. 13B and 13C, in an embodiment of block 806, the handle 602 on the cable release system 600 may then be used to move the elongated base 604 and actuation member 606 on the cable release system 600 in a direction 1302 such that the actuation member 606 (e.g., the single actuation member 606b on the transceiver device cable release system 600b of FIG. 6C in this example) engages and actuates the release button 306a on the transceiver device 306 such that the cable connector securing subsystem in the transceiver device 306 no longer engage the cable connector system 500, illustrated in FIG. 13C.

Figure 14C:
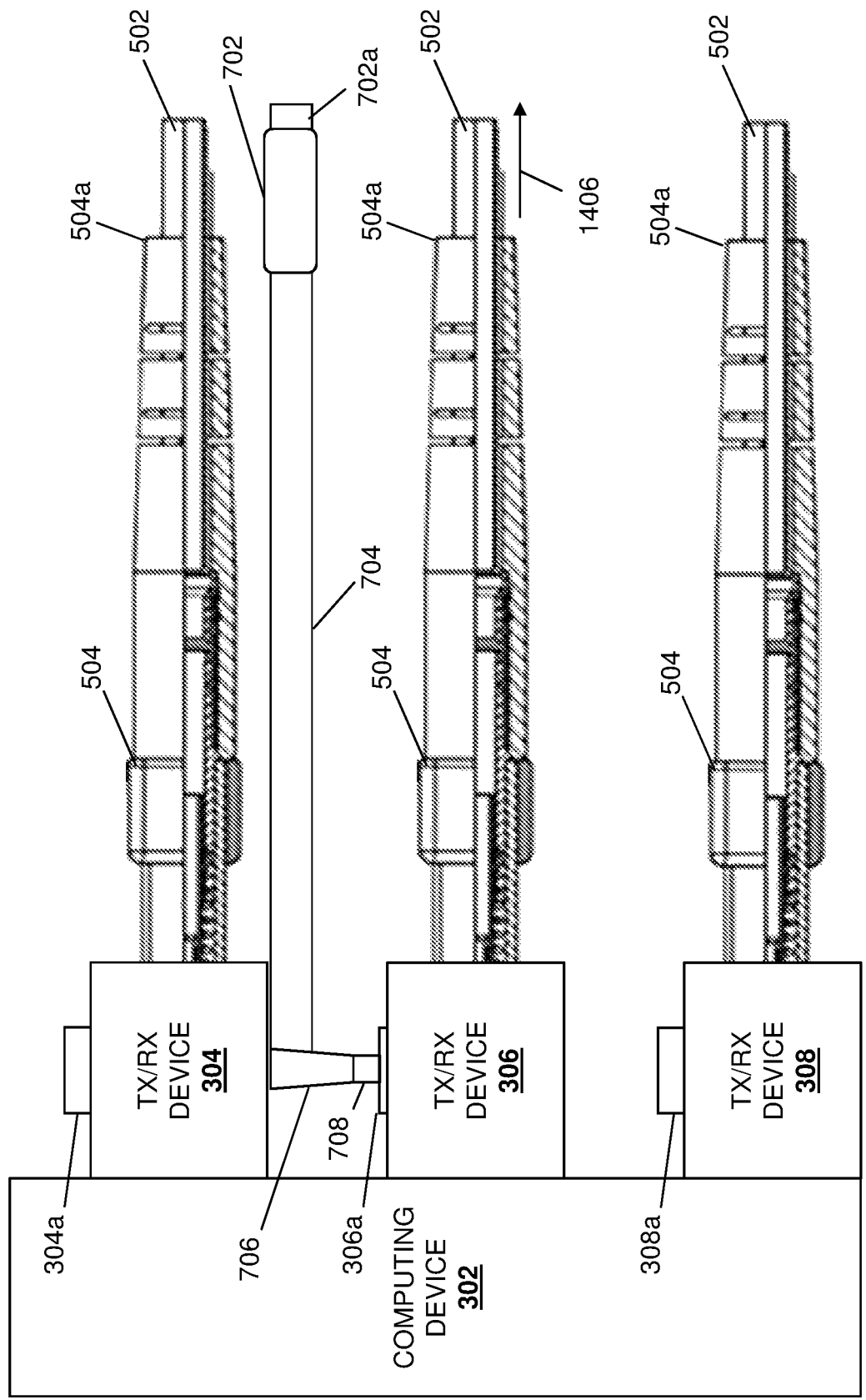
FIG. 14C is a side schematic view illustrating the cable release system of FIGS. 7A, 7B, and 7D being utilized with the cable connector systems and computing system of FIG. 10 during the method of FIG. 8.

With reference to FIGS. 14B and 14C, in an embodiment of block 806, the trigger element 702a on the handle 702 of the cable release system 700 may then be moved in a direction 1402, which as discussed above may cause the actuation element 708 in the actuation member 706 (e.g., the actuation element 708b in the single actuation member 706b on the transceiver device cable release system 700b of FIG. 7D in this example) to extend out of the actuation member 706 to engage and actuate the release button 306a on the transceiver device 306 such that the cable connector securing subsystem in the transceiver device 306 no longer engage the cable connector system 500, illustrated in FIG. 13C.

The method 800 then proceeds to block 808 where the cable connector is disconnected from the computing system. With reference to FIG. 11C, in an embodiment of block 808, the cable connector system 400 that was secured to the transceiver device 206 may be moved in a direction 1104 (i.e., due to the disengagement of the securing latches 408 from the transceiver device 206), which will disengage the cable connectors 406 on the cable connector system 400 from the transceiver connectors on the transceiver device 206, and disconnect the cable connector system 400 from the transceiver device 206 and computing device 202. With reference to FIG. 12C, in an embodiment of block 808, the cable connector system 400 that was secured to the transceiver device 206 may be moved in a direction 1206 (i.e., due to the disengagement of the securing latches 408 from the transceiver device 206), which will disengage the cable connectors 406 on the cable connector system 400 from the transceiver connectors on the transceiver device 206, and disconnect the cable connector system 400 from the transceiver device 206 and computing device 202.

With reference to FIG. 13C, in an embodiment of block 808, the cable connector system 500 that was secured to the transceiver device 306 may be moved in a direction 1304 (i.e., due to the disengagement of the cable connector securing subsystem in the transceiver device 306 from the cable connector system 500), which will disengage the cable connectors 506 on the cable connector system 500 from the transceiver connectors on the transceiver device 306, and disconnect the cable connector system 500 from the transceiver device 306 and computing device 302. With reference to FIG. 14C, in an embodiment of block 808, the cable connector system 500 that was secured to the transceiver device 306 may be moved in a direction 1406 (i.e., due to the disengagement of the cable connector securing subsystem in the transceiver device 306 from the cable connector system 500), which will disengage the cable connectors 506 on the cable connector system 500 from the transceiver connectors on the transceiver device 306, and disconnect the cable connector system 500 from the transceiver device 306 and computing device 302.

Thus, systems and methods have been described that provide for the release of fiber optic cables from transceiver devices connected to a computing device via the use of a cable release system that may be used to actuate a fiber optic cable connector release subsystem connecting any fiber optic cable connector to a transceiver device. For example, the fiber optic cable release system of the present disclosure may include a handle. An elongated base extends from the handle and includes a length that allows the handle to be held adjacent a fiber optic cable connector distal end of a fiber optic cable connector that is connected to a transceiver device while the elongated base extends adjacent the fiber optic cable connector and an elongated base distal end of the elongated base is located adjacent a securing latch on the fiber optic cable connector. An actuating member is located on the elongated base distal end of the elongated base and is configured to actuate the securing latch on the fiber optic cable connector when the elongated base distal end of the elongated base is located adjacent the securing latch on the fiber optic cable connector. As such, the deficiencies of conventional "pull-tab" release mechanisms on fiber optic cable connector systems are eliminated, reducing support calls, system down time, and/or other associated costs Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable release system, comprising:
   a handle;
   an elongated base that extends from the handle and that includes a length that is configured to allow the handle to be held adjacent a cable connector distal end of a cable connector that is connected to a computing device while the elongated base extends adjacent the cable connector and an elongated base distal end of the elongated base is located adjacent a securing latch on the cable connector; and
   an actuating member that is located on the elongated base distal end of the elongated base and that is configured to actuate the securing latch on the cable connector when the elongated base distal end of the elongated base is located adjacent the securing latch on the cable connector and an actuating element that is housed in the actuating member moves relative to and out of the actuating member and towards the securing latch on the cable connector to actuate the securing latch and allow the cable connector to be disconnected from the computing device.

2. The system of claim 1, wherein the actuating element is coupled to at least one linkage, and wherein a translator member is coupled to the at least one linkage and configured to translate a force provided adjacent the handle via the at least one linkage to cause the actuating element to move relative to and out of the actuating member.

3. The system of claim 2, wherein the at least one linkage includes a first linkage that extends through the elongated base between the handle and the actuation member, and where in the translator is located in the actuation member.

4. The system of claim 1, further comprising:
   a trigger element that is included on the handle and coupled to the actuating element, wherein the trigger element is configured to be triggered to cause the actuating element that is housed in the actuating member to move relative to and out of the actuating member.

5. The system of claim 1, wherein the actuation member extends perpendicularly from the elongated base.

6. The system of claim 1, wherein the cable connector is a fiber optic cable connector.

7. An Information Handling System (IHS), comprising:
   a processing system;
   a system connector that is coupled to the processing system;
   a cable connector that is connected to the system connector and that includes a securing latch that engages the system connector to secure the cable connector to the system connector; and
   a cable release system that includes:
      a handle;
      an elongated base that extends from the handle and that includes a length that is configured to allow the handle to be held adjacent a cable connector distal end of the cable connector while the elongated base extends adjacent the cable connector and an elongated base distal end of the elongated base is located adjacent the securing latch; and
      an actuating member that is located on the elongated base distal end of the elongated base and that is configured to actuate the securing latch when the elongated base distal end of the elongated base is located adjacent the securing latch on the cable connector and an actuating element that is housed in the actuating member moves relative to and out of the actuating member and towards the securing latch on the cable connector to actuate the securing latch and allow the cable connector to be disconnected from the computing device.

8. The IHS of claim 7, wherein the actuating element is coupled to at least one linkage, and wherein a translator member is coupled to the at least one linkage and configured to translate a force provided adjacent the handle via the at least one linkage to cause the actuating element to move relative to and out of the actuating member.

9. The IHS of claim 8, wherein the at least one linkage includes a first linkage that extends through the elongated base between the handle and the actuation member, and where in the translator is located in the actuation member.

10. The IHS of claim 7, further comprising:
    a trigger element that is included on the handle and coupled to the actuating element, wherein the trigger element is configured to be triggered to cause the actuating element that is housed in the actuating member to move relative to and out of the actuating member.

11. The IHS of claim 7, wherein the actuation member extends perpendicularly from the elongated base.

12. The IHS of claim 7, wherein the cable connector is a fiber optic cable connector.

13. The IHS of claim 7, wherein the system connector is included on a transceiver device that is coupled to the processing system.

14. A method for releasing a cable, comprising:
positioning, using a handle, an elongated base that extends from the handle adjacent a cable connector that is connected to a computing device such that the handle is located adjacent a cable connector distal end of the cable connector and a length of the elongated base extends adjacent the cable connector such an elongated base distal end of the elongated base is located adjacent a securing latch on the cable connector;
moving an actuating element, which is housed in an actuating member that is located on the elongated base distal end of the elongated base, relative to and out of the actuating member and towards the securing latch on the cable connector to actuate the securing latch on the cable connector when the elongated base distal end of the elongated base is located adjacent the securing latch on the cable connector; and
disconnecting, while actuating the securing latch, the cable connector from the computing device.

15. The method of claim 14, wherein the moving the actuating element relative to and out of the actuating member includes:
translating, using a translator member that is coupled to at least one linkage coupled to the actuating element, a force provided adjacent the handle via the at least one linkage to cause the actuating element to move relative to and out of the actuating member.

16. The method of claim 15, wherein the at least one linkage includes a first linkage that extends through the elongated base between the handle and the actuation member, and where in the translator is located in the actuation member.

17. The method of claim 14, further comprising:
triggering a trigger element that is included on the handle and coupled to the actuating element to cause the actuating element that is housed in the actuating member to move relative to and out of the actuating member.

18. The method of claim 14, wherein the actuation member extends perpendicularly from the elongated base.

19. The method of claim 14, wherein the cable connector is a fiber optic cable connector.

20. The method of claim 14, wherein the cabled connector is connected to the computing device via a transceiver device that is connected to the computing device.

* * * * *